(12) United States Patent
Shiwa et al.

(10) Patent No.: US 7,784,067 B2
(45) Date of Patent: Aug. 24, 2010

(54) OPTICAL DISK APPARATUS

(75) Inventors: Masayuki Shiwa, Fukuoka (JP); Katsumi Ichinose, Fukuoka (JP)

(73) Assignee: Panasonic Corporation, Osaka (JP)

( * ) Notice: Subject to any disclaimer, the term of this patent is extended or adjusted under 35 U.S.C. 154(b) by 992 days.

(21) Appl. No.: 11/482,708

(22) Filed: Jul. 10, 2006

(65) Prior Publication Data
US 2007/0016916 A1 Jan. 18, 2007

(30) Foreign Application Priority Data
Jul. 12, 2005 (JP) ............................. 2005-202756
Mar. 24, 2006 (JP) ............................. 2006-082309

(51) Int. Cl.
*G11B 17/056* (2006.01)
(52) U.S. Cl. .................................................. 720/602
(58) Field of Classification Search ................. 720/602, 720/601
See application file for complete search history.

(56) References Cited
U.S. PATENT DOCUMENTS
5,883,870 A * 3/1999 Akiba et al. ................ 720/602
7,296,277 B2 * 11/2007 Ohno et al. ................. 720/602

FOREIGN PATENT DOCUMENTS
JP 2003296997 10/2003

* cited by examiner

*Primary Examiner*—Angel A. Castro
(74) *Attorney, Agent, or Firm*—Dickinson Wright PLLC

(57) ABSTRACT

An optical disk apparatus includes a frame 2 which receives internal devices and can receive an optical disk 27, a tray 5 on which the optical disk 27 is rotatably mounted, a rail 4 which supports the tray so as to be moved between a mounting position where the optical disk 27 is detachably mounted and a receiving position where the optical disk 27 is received in the frame 2, a tray moving means which moves the tray 5 between the mounting position and the receiving position, a tray receiving releasing member which receives and release the tray 5 at the receiving position, and an optical disk rotation suppressing member which exerts a pressing force on the optical disk in cooperation with a tray releasing operation of the tray receiving releasing member and releases the pressing force in cooperation with a tray receiving operation of the tray receiving releasing member.

9 Claims, 18 Drawing Sheets

OPTICAL DISK APPARATUS

BACKGROUND OF THE INVENTION

1. Field of the Invention

The present invention relates to an optical disk apparatus for performing playback and recording of an optical disk.

2. Description of the Related Art

As an apparatus for performing playback or recording of optical disk media such as MOs, PDs, CDs, CD-ROMs, CD-Rs, CD-RWs, DVD-ROMS, DVD-RAMs, ±RWs, and ±Rs, there are a CD-ROM drive apparatus, a PD drive apparatus, and the like. In the present invention, these apparatuses are collectively referred to as an optical disk apparatus.

Conventionally, the optical disk apparatus has been implemented as a small-sized, thin apparatus, so that the apparatus is installed in a portable personal computer (hereinafter, referred to as a PC). Recently, in many cases, the optical disk apparatus has been installed in a small-sized, thin notebook PC.

This is because a large amount of data is required for software used to a computer and because inexpensive CD-ROMs distributed together with media such as magazines are widely employed. Therefore, the optical disk driver has been necessarily installed in the computer (for example, see Patent Document 1).

Now, an example of the aforementioned conventional disk apparatus (Japanese Unexamined Patent Application Publication No. 2003-296997) is described. A structure of an optical disk drive having a total thickness of 12.7 mm used for a notebook PC or a thin desktop PC (including a display-body-integrated PC) is described. Conventionally, two types are proposed as follows.

In the one type, a user directly mounts an optical disk on a turntable, that is, a part of the pickup and pushes a tray including the turntable into a drive case by the hand, so that the apparatus becomes in a state that playback and recording of the optical disk can be performed. The type is called a drawer type.

In the other type, the optical disk is moved to a front surface of the apparatus, and the optical disk is inserted in a slit formed on a cover called a front bezel formed on the front surface of the apparatus. When the optical disk is inserted into a predetermined position in the apparatus, the optical disk is automatically is inserted into an inner portion of the apparatus, that is, the turntable by an insertion member such as a roller provided in an inner portion of the apparatus. The type is called a slot loading type.

Commercially, the drawer type is dominating, so that most of markets are occupied by the drawer type. In the drawer type, a U-shaped flexible board is used to electrically connect the tray to a board for connecting the optical disk apparatus to the PC.

FIG. 17 is an exploded perspective view showing a conventional drawer type disk apparatus. Referring to FIG. 17, reference numeral 100 denotes an optical disk rotation suppressing member which is disposed at one end portion of a bottom cover 106b and made of a flexible material such as sponge and contacts an optical disk 27 to stop rotation of the optical disk 27. Reference numeral 101 denotes a tray on which the optical disk 27 is rotatably mounted. Reference numeral 102 denotes a spindle motor. Reference numeral 103 denotes a turntable. Reference numeral 104 denotes a front bezel. Reference numeral 105 denotes a rail which connects the tray 101 to a frame. Reference numeral 106a denotes an upper cover which constitutes an upper frame and protects the optical disk apparatus from a weight force or the like exerted from an upper portion. Reference numeral 106b denotes a bottom cover which constitutes a lower frame and supports the tray 101, the rail 105, and the like. Reference numeral 107 denotes a rail guide which is attached to the bottom cover 106b and allows the rail 105 and the tray 101 to smoothly slide. Reference numeral 108 denotes a main board which is attached to the bottom cover 106b in the example. Reference numeral 109 denotes an auxiliary board which electrically connects the main board 108 to the pickup module for reading out information recorded on the optical disk 27 mounted on the tray 101. Reference numeral 110 denotes a flexible board which electrically connects the auxiliary board 109 to the main board 108.

In the conventional optical disk apparatus having such a construction, when the tray 101 is moved and received in a receiving position in the frame as shown by an arrow of FIG. 17, the optical disk rotation suppressing member 100 contacts the optical disk 27, so that the rotation of the optical disk 27 is stopped.

In addition, FIGS. 18(a) and 18(b) are partial enlarged views of a member of holding the tray in the frame which has been recently used in companies. FIG. 18(a) shows a state that the tray 101 is fixed (received) by the latching solenoid 111. FIG. 18(b) is a view showing a state that the fixing (receiving) of the tray 101 is released by the fixing releasing spring 116 after the latching solenoid 111 is turned on. Reference numeral 111 denotes a latching solenoid which uses a permanent magnet in a magnetic circuit and performs holding in a suction state by using a suction force of the permanent magnet.

Reference numeral 111a denotes a plunger. Reference numeral 111b denotes a coil. Reference numeral 111c denotes a permanent magnet. Reference numeral 112 denotes a fixing means which is engaged with the fixing pin 103 attached on the bottom cover 106b (see FIG. 17) to hold the tray 101 in the inner portion of the frame. Reference numeral 114 denotes a fixing means rotation spring for exerting a weight force in a rotational direction on the fixing means 112. Reference numeral 115 denotes a fixing releasing member which pulls the plunger 111a in a direction h shown in the figure to release the receiving of the tray 101 when a current is applied to the latching solenoid 111. Reference numeral 116 denotes a fixing releasing spring which exerts a force of pulling the plunger 111a on the fixing releasing member 115. Reference numeral 117 denotes a restoring member which contacts the fixing pin 113 to restore the fixing releasing member 115 to a fixing position when the tray 101 is inserted into the bottom cover 106b. Reference numeral 118 is a hold spring which holds the restoring member 117 at a position where the restoring member accurately contacts the fixing pin 113 when the tray 101 is inserted to the bottom cover 106b. Reference number 119 denotes a compulsory ejection member which is used to release the fixing of the tray 101 to the frame by inserting a pin or other members from the front surface of the apparatus to rotate the member, and allowing a cam portion to push a cam of the fixing means 112 in a case where a voltage cannot be supplied to the optical disk apparatus due to a power disconnection of the PC and in a case where the tray 101 cannot be taken out from the frame due to an operational failure of the optical disk apparatus.

In a state of FIG. 18(a), when the coil 111b is turned on, a magnetic field for canceling a suction force of the permanent magnet 111c is generated, so that the plunger 111a is moved in a direction h in the figure by the fixing releasing spring 116, and the fixing releasing member 115 is rotated in a direction j of the figure. Next, the fixing releasing member 115 provides a driving force to the fixing means 112 in the rotational direction, so that the receiving of the tray 101 is released. Next, after the optical disk is mounted on the tray 101, when the tray is inserted into the bottom cover 106b, the fixing pin 113 attached on the bottom cover is relatively moved in a direction 1 of the figure to contact the restoring member 117, so that the restoring member 117 is rotated in a direction k of the figure. Therefore, the fixing releasing member 115 engaged with the restoring member 117 is rotated in a reverse direction of the direction of the releasing time. As a result, the plunger 111a is moved in the reverse direction of the direction h to be suctioned to the permanent magnet 111c, so that the receiving of the tray 101 is completed.

Currently, an optical disk apparatus employed by a notebook computer of which portability is an important factor mainly has a total thickness of 12.7 mm. In addition, currently, a thin, light-weight notebook computer of which portability is more importance factor has a total thickness of 9.5 mm. In the future, thinner and lighter notebook computers are expected to be distributed, so that a new thinner and lighter optical disk apparatus may be required. In addition, due to multi-functional drives, an optical base plate and a pickup mode for supporting and carrying thereof become large, so that an area capable of accommodating the tray and operational means in an inner portion of a case of the optical disk apparatus is reduced.

Therefore, in a thin optical disk apparatus a thickness of 9.5 mm or less becomes a form factor of an optical disk apparatus built in a current notebook PC. It is practically impossible to employ a structure were a step difference is formed on a sheet metal member surrounding a lower portion of the frame.

In conventional optical disk apparatuses having a total thinness of 12.7 mm and 9.5 mm, a rail for connecting the tray to the frame is located at a left end of the frame and a step difference formed along the frame. For the reason, a right end portion of the frame becomes a surplus space except for an area where the optical disk is rotated. In the space, an optical disk rotation suppressing member 100 which directly contacts an end surface of the optical disk to stop the rotation of the optical disk when the tray is taken out from the frame may be disposed (see FIG. 17)

On the other hand, in a thinner optical disk apparatus, the rails are located at left and right ends of the tray, and a predetermined strength is required for the rails and the tray. Therefore, the optical disk rotation suppressing member 100 which is disposed to prevent the optical disk in a rational state from being discharged when the tray is taken out from the frame cannot be disposed at the same position of the optical disk apparatuses having a total thickness of 12.7 mm and 9.5 mm In addition, when members having the same function are disposed on the upper cover or the like, a member for preventing the rotation of the optical disk and a structure for moving the member in synchronization with the movement of a carrying means are needed, so that a total thickness of the optical disk apparatus cannot be reduced.

SUMMARY OF THE INVENTION

The present invention is contrived in order to solve the aforementioned problems, and an object of the present invention is to provide an optical disk apparatus capable of reducing a thickness in comparison with a conventional apparatus, and more specifically, of having a total thickness of 9.5 mm or less.

In order to solve the aforementioned problem, the present invention provides an optical disk apparatus comprising: a frame which receives internal devices and can receive an optical disk; a tray on which the optical disk is rotatably mounted; a rail which supports the tray so as to be moved between a mounting position where the optical disk is detachably mounted and a receiving position where the optical disk is received in the frame; a tray moving means which moves the tray between the mounting position and the receiving position; a tray receiving releasing member which receives and release the tray at the receiving position; and an optical disk rotation suppressing member which exerts a pressing force on the optical disk in cooperation with a tray releasing operation of the tray receiving releasing member and releases the pressing force in cooperation with a tray receiving operation of the tray receiving releasing member.

In addition, the rail which supports the tray movably is formed at both sides of the tray, and the optical disk rotation suppressing member cooperates with the tray receiving releasing member and is formed in the tray. According to the construction, it is possible to greatly reduce a total thickness of the optical disk apparatus, and more specifically, it is possible to provide an optical disk apparatus having a total thickness of 9.5 mm or less.

In the optical disk apparatus according to the present invention, the optical disk rotation suppressing member is disposed in the tray, and the rail which supports the tray movably with respect to the frame is disposed to the tray and both sides thereof, so that it is possible to implement an optical disk apparatus capable of securing safety and having a total thickness of 9.5 mm or less

BRIEF DESCRIPTION OF THE DRAWINGS

FIG. 5(a) is a view for explaining operations of the optical disk rotation suppressing member and the tray receiving releasing member and showing a state that a tray is received by a latching solenoid, and FIG. 5(b) is a view for explaining operations of the optical disk rotation suppressing member and the tray receiving releasing member and showing a state that the receiving is released by a fixing releasing spring after the latching solenoid is turned on.

FIG. 8(a) is a view for explaining operations of an optical disk rotation suppressing member and a tray receiving releasing member according to a second embodiment of the present invention and showing a state that a tray is received by a latching solenoid, and FIG. 8(b) is a view for explaining operations of the optical disk rotation suppressing member and the tray receiving releasing member according to the second embodiment of the present invention and showing a state that the receiving is released by a fixing releasing spring after the latching solenoid is turned on.

DESCRIPTION OF THE PREFERRED EMBODIMENTS

Figure 1:
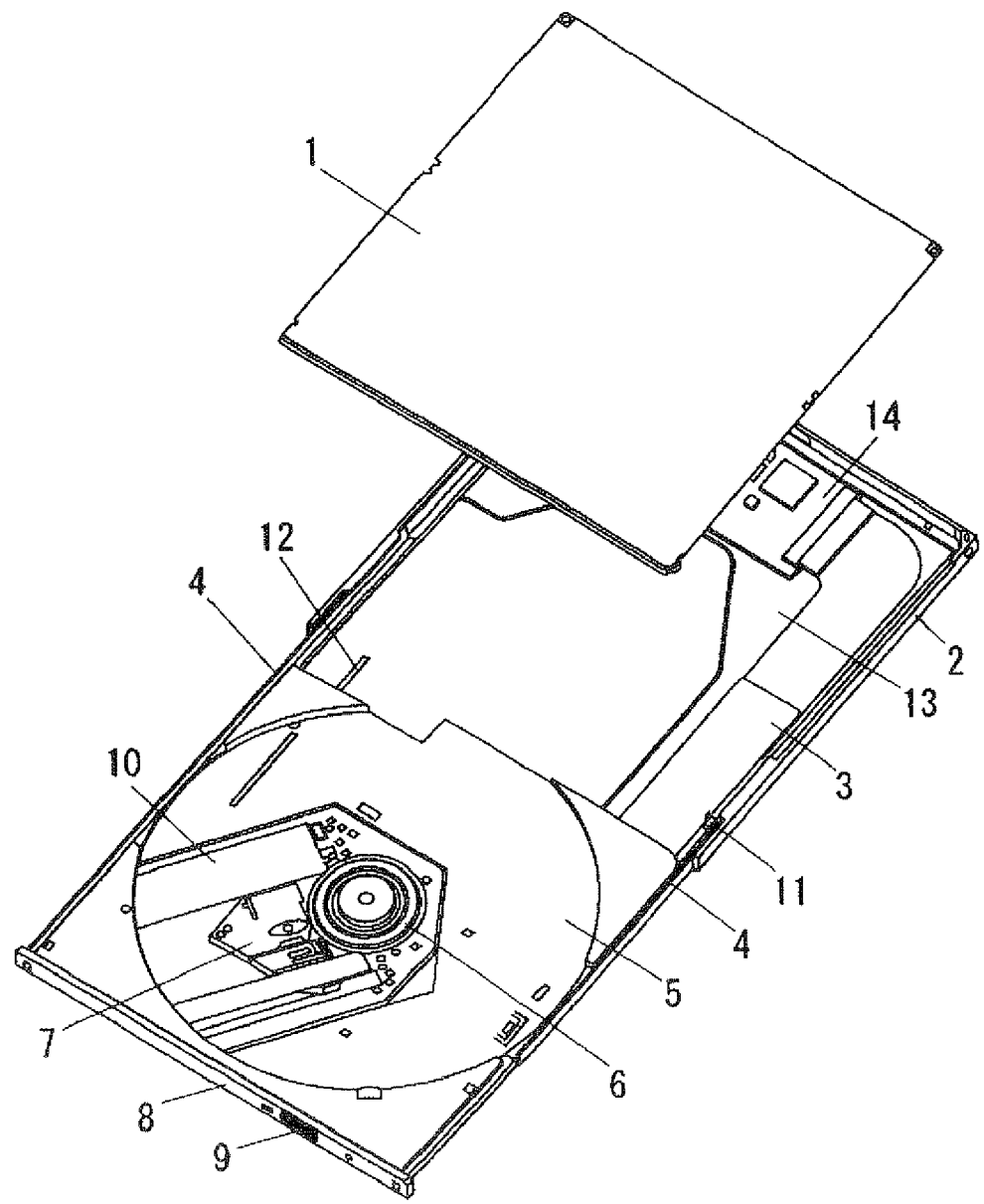
FIG. 1 is an exploded perspective view of an optical disk apparatus according to a first embodiment of the present invention.

An optical disk apparatus according to Claim 1 of the present invention comprises: a frame which receives internal devices and can receive an optical disk; a tray on which the optical disk is rotatably mounted; a rail which is formed between both sides of the tray and the frame and supports the tray so as to be moved between a mounting position where the optical disk is detachably mounted and a receiving position where the optical disk is received in the frame; a tray moving means which moves the tray between the mounting position and the receiving position; a tray receiving releasing member which receives and releases the tray at the receiving position; and an optical disk rotation suppressing member which is formed in the tray to exert a pressing force on the optical disk in cooperation with a tray releasing operation of the tray receiving releasing member and remove the pressing force in cooperation with a tray receiving operation of the tray receiving releasing member. According to the construction, it is possible to form the rail which supports the tray movably at both sides of the tray, and since the optical disk rotation suppressing member cooperates with the tray receiving releasing member and is formed in the tray, it is possible to obtain an optical disk apparatus of which total thickness is greatly reduced.

An optical disk apparatus according to Claim 2, in the optical disk apparatus according to Claim 1, the optical disk rotation suppressing member is moved on a surface which is the same as the optical disk, has a rotational shaft at a circumferential portion of the optical disk, and has a pressing member for exerting a pressing force on the tray receiving releasing member. According to the construction, the pressing member has a function of exerting the pressing force along the rotational direction in a shape of an arc in cooperation with the tray receiving releasing member.

An optical disk apparatus according to Claim 3, in the optical disk apparatus according to Claim 1, the optical disk rotation suppressing member includes a pressing member which has a rotational shaft at a circumferential portion of the optical disk and moves in a recording surface direction or in a level surface direction to exerts the pressing force on the tray receiving releasing member. According to the construction, the pressing member has a function of exerting the pressing force along the rotational direction in a shape of an arc in cooperation with the tray receiving releasing member.

An optical disk apparatus according to Claim 4, in the optical disk apparatus according to Claim 1, the optical disk rotation suppressing member includes a pressing member which moves on a surface which is the same as that of the optical disk and exerts the pressing force on the circumferential portion the optical disk. According to the construction, the pressing member can exert the pressing force on the circumferential portion of the optical disk in a straight line direction on the same surface in cooperation with the tray receiving releasing member.

An optical disk apparatus according to Claim 5, in the optical disk apparatus according to Claim 1, the optical disk rotation suppressing member includes a pressing member which has a rotational shaft at a circumferential portion of the optical disk and moves in a recording surface direction or in a level surface direction to exerts the pressing force on the circumferential portion of the optical disk. According to the construction, the pressing member can exert the pressing force on the circumferential portion of the optical disk in a straight line direction on the same surface in cooperation with the tray receiving releasing member.

An optical disk apparatus according to Claim 6, in the optical disk apparatus according to Claim 1, the tray receiving releasing member functions as a compulsory ejection member. According to the construction, it is possible to reduce the number of parts and to further reduce sizes of the tray receiving releasing member and the compulsory ejection member.

An optical disk apparatus according to Claim 7, in the optical disk apparatus according to Claim 6, the tray receiving releasing member functions as a rotation suppressing operation member which operates the optical disk rotation suppressing member in a rotation suppressing direction. According to the construction, it is possible to reduce the number of parts and to further reduce sizes of the tray receiving releasing member, the compulsory ejection member, and the rotation suppressing operation member.

An optical disk apparatus according to Claim 8, in the optical disk apparatus according to Claim 6, the tray receiving releasing member functions as a pressing force exertion releasing member which removes a force for operating the optical disk rotation suppressing member in a rotation suppressing direction. According to the construction, it is possible to reduce the number of parts and to further reduce sizes of the tray receiving releasing member, the compulsory ejection member, and the rotation suppressing operation member.

An optical disk apparatus according to Claim 9, in the optical disk apparatus according to Claim 6, the tray receiving releasing member functions as a pressing force exertion releasing member which removes a force used to exert the pressing force on the optical disk with respect to the optical disk rotation suppressing member. According to the construction, it is possible to reduce the number of parts. Since the optical disk rotation suppressing member can remove the pressing force on the optical disk in cooperation with the compulsory ejection operation of the compulsory ejection member or remove the pressing force on the optical disk in cooperation with the eject restoring operation, it is possible to further reduce sizes of the tray receiving releasing member, the compulsory ejection member, and the rotation suppressing operation member.

An optical disk apparatus according to Claim 8, in the optical disk apparatus according to Claim 1, a part of the compulsory ejection member is an eject lever of which contacted portion is used to be exerted by an operational force at a compulsory ejection time, and the eject lever can be moved in parallel to a direction substantially equal to the operational force exerted on the contacted portion at the compulsory ejection time. According to the construction, since the number of rotational parts of the compulsory ejection member is reduced, it is possible to further simplify the construction and to transmit the operational force at the compulsory ejection time without loss in the operational force.

An optical disk apparatus according to Claim 9, in the optical disk apparatus according to Claim 3, at least one part shared by the tray receiving releasing member, the compulsory ejection member, and the rotation suppressing operation member is horizontally moved in a direction substantially equal to the direction of the compulsory ejection operational force exerted on the compulsory ejection member at the compulsory ejection time. According to the construction, since the number of rotational parts of the compulsory ejection member or the rotation suppressing operation member is reduced, it is possible to further simplify the construction and to transmit the operational force at the compulsory ejection time without loss in the operational force.

In the optical disk apparatus according to Claim 4 and 5, at least one part shared by the tray receiving releasing member, the compulsory ejection member, and the pressing force exertion releasing member is horizontally moved in a direction substantially equal to the direction of the compulsory ejection operational force exerted on the compulsory ejection member at the compulsory ejection time. According to the construction, since the number of rotational parts of the compulsory ejection member or the pressing force exertion releasing member is reduced, it is possible to further simplify the construction and to transmit the operational force at the compulsory ejection time without loss in the operational force.

An optical disk apparatus according to Claim 7, in the optical disk apparatus according to Claim 1, a thickness of the frame, that is, a total thickness of the apparatus is 9.5 mm or less. According to the construction, it is possible to reduce a total thickness down to a predetermined standard size without deterioration in reliability or durability.

Hereinafter, preferred embodiments of the present invention will be described in detail with reference to the drawings. Like elements are denoted by like reference numerals, and redundant description is omitted. The description is made with respect to the preferred embodiments of the present invention, but the present invention is not limited to the embodiments. Hereinafter, embodiments of the present invention will be described with reference to the accompanying drawings.

First Embodiment

Figure 2:
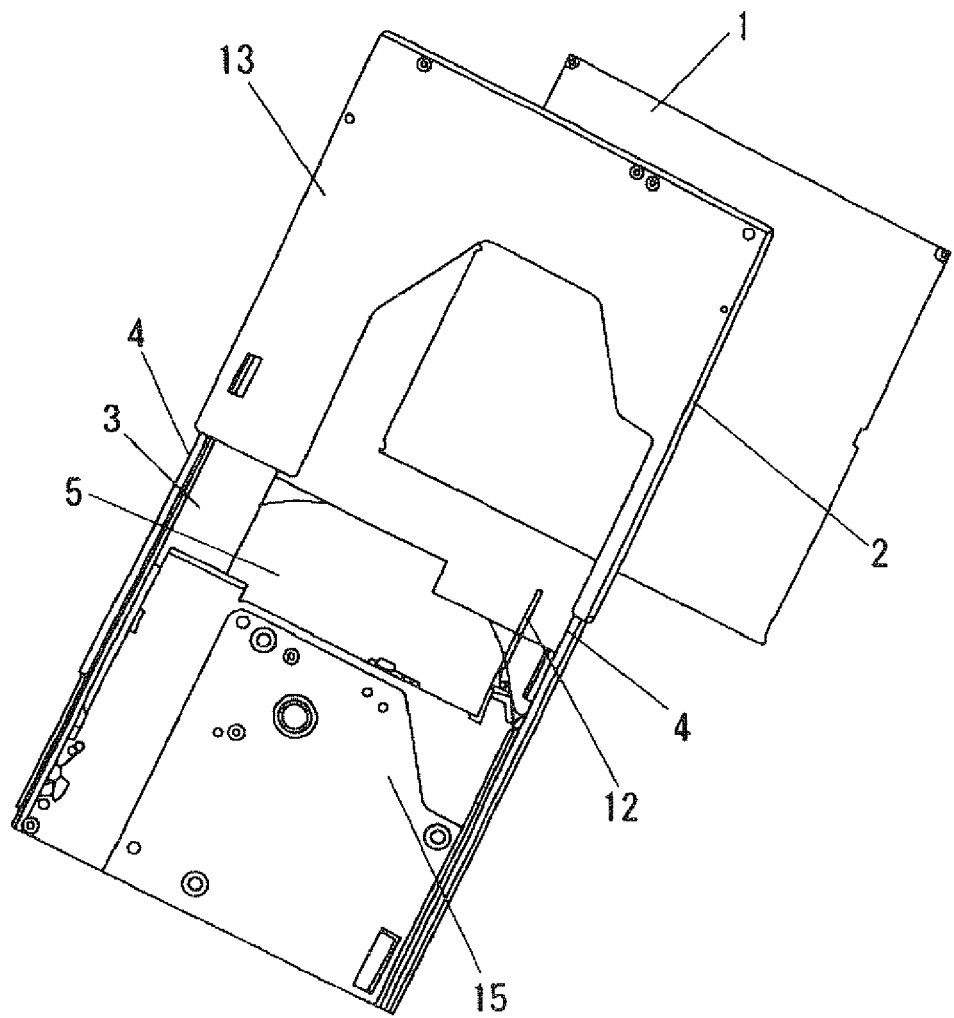
FIG. 2 is an exploded perspective view of the optical disk apparatus of FIG. 1 as seen from a rear side thereof.
Figure 3:
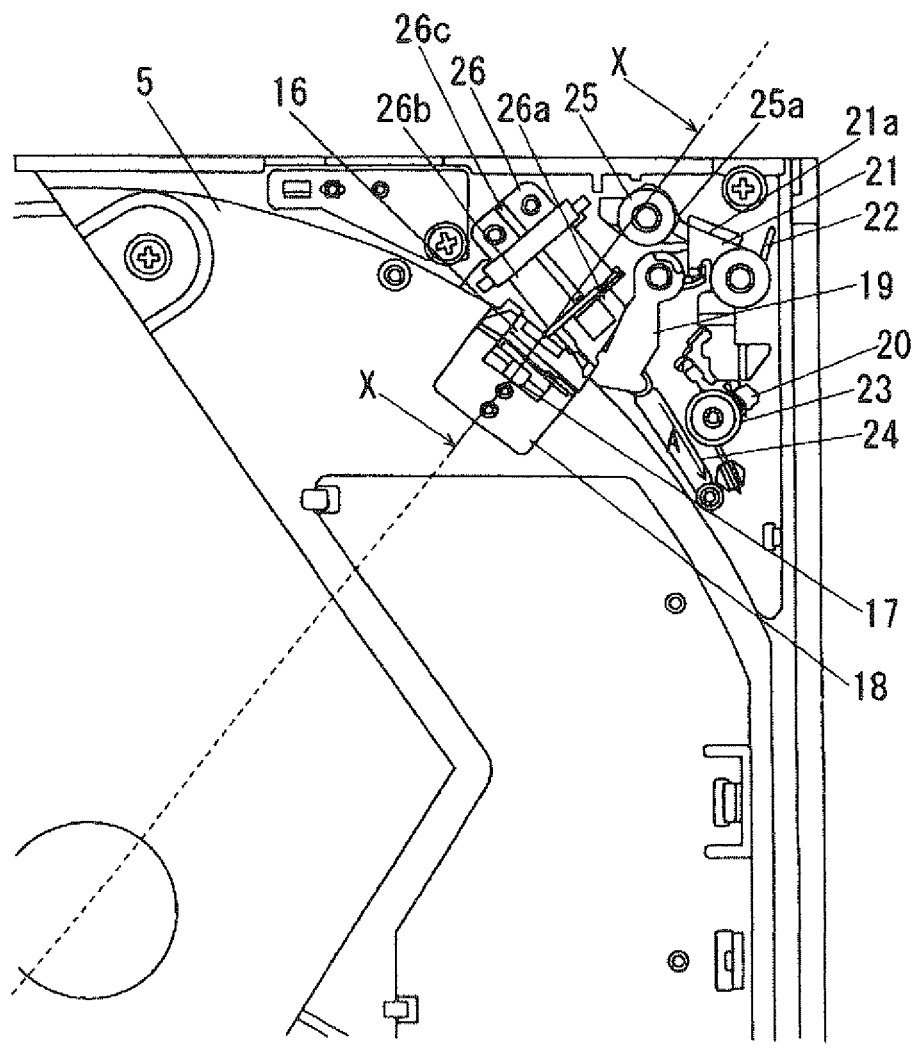
FIG. 3 is a partial enlarged view of an optical disk rotation suppressing member and a tray receiving releasing member.
Figure 4:
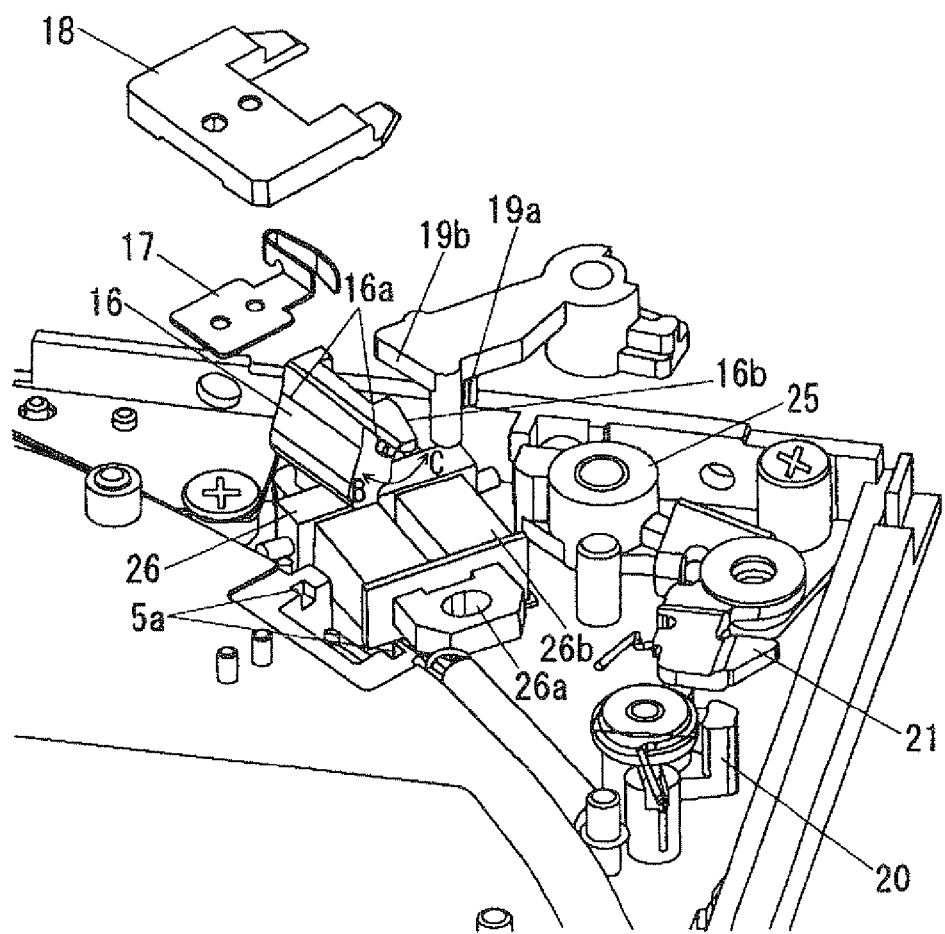
FIG. 4 is an exploded perspective view of the optical disk rotation suppressing member and the tray receiving releasing member.
Figure 5:
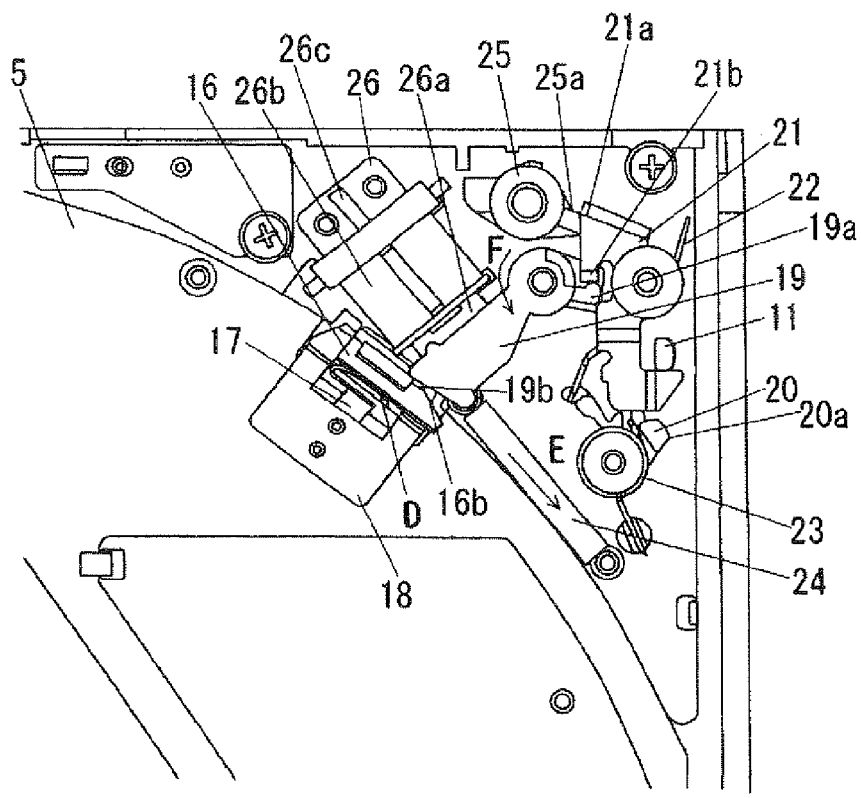
Figure 5:
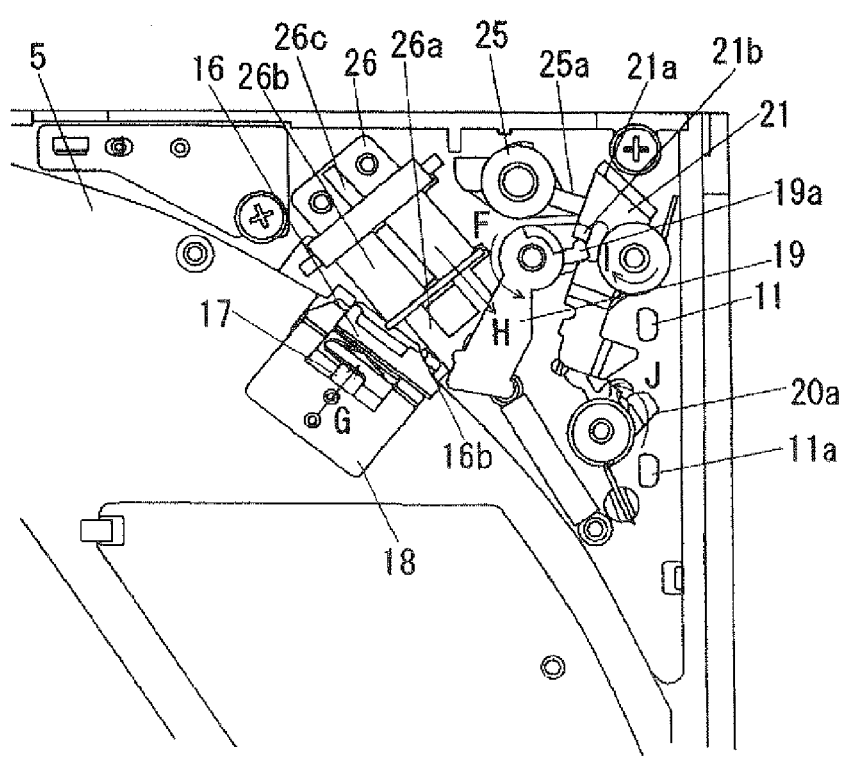
Figure 6:
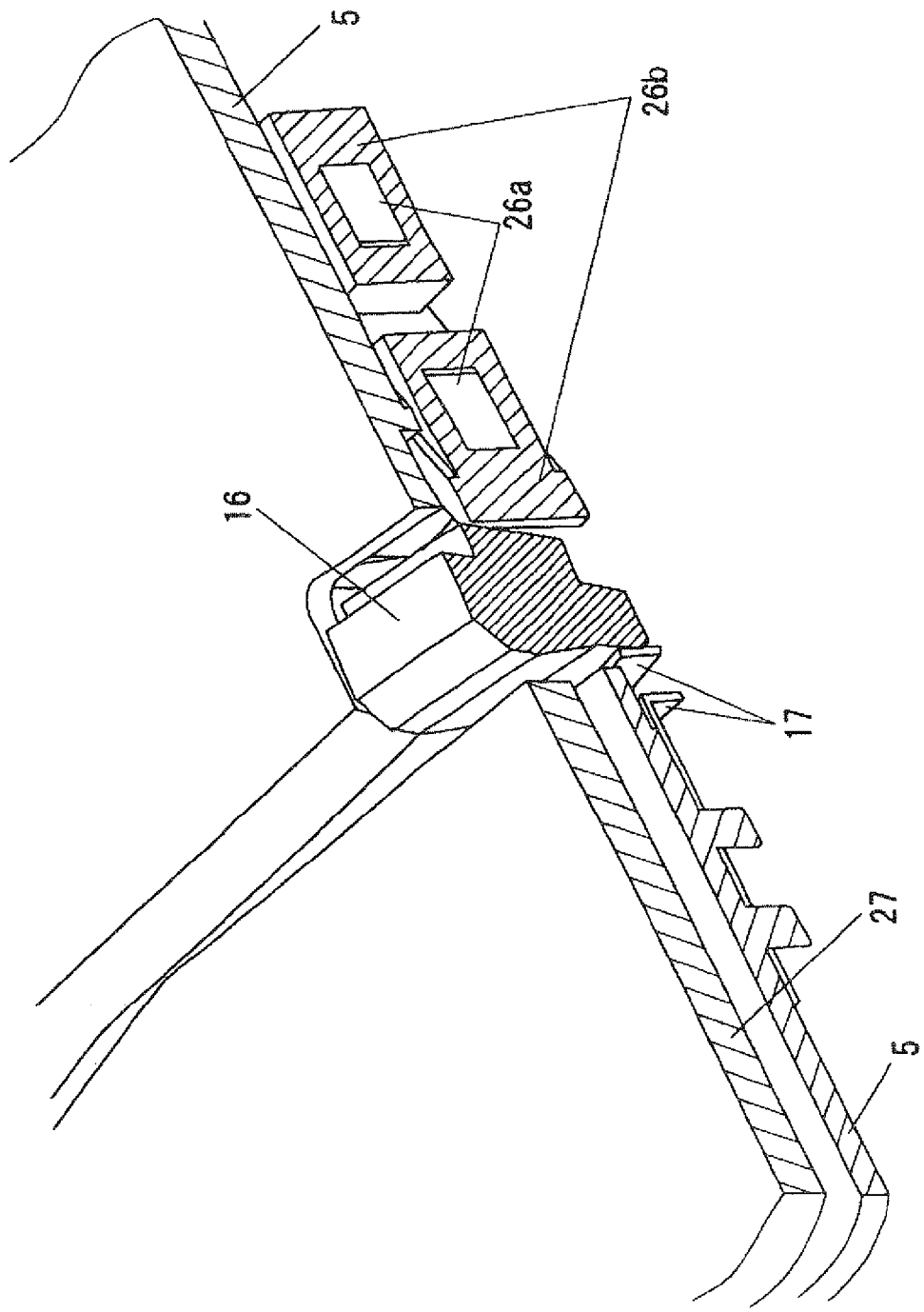
FIG. 6 is a cross sectional view for explaining operations of the optical disk rotation suppressing member in a state corresponding to FIG. 5(a) in an arrow direction taken along line X-X of FIG. 3.
Figure 7:
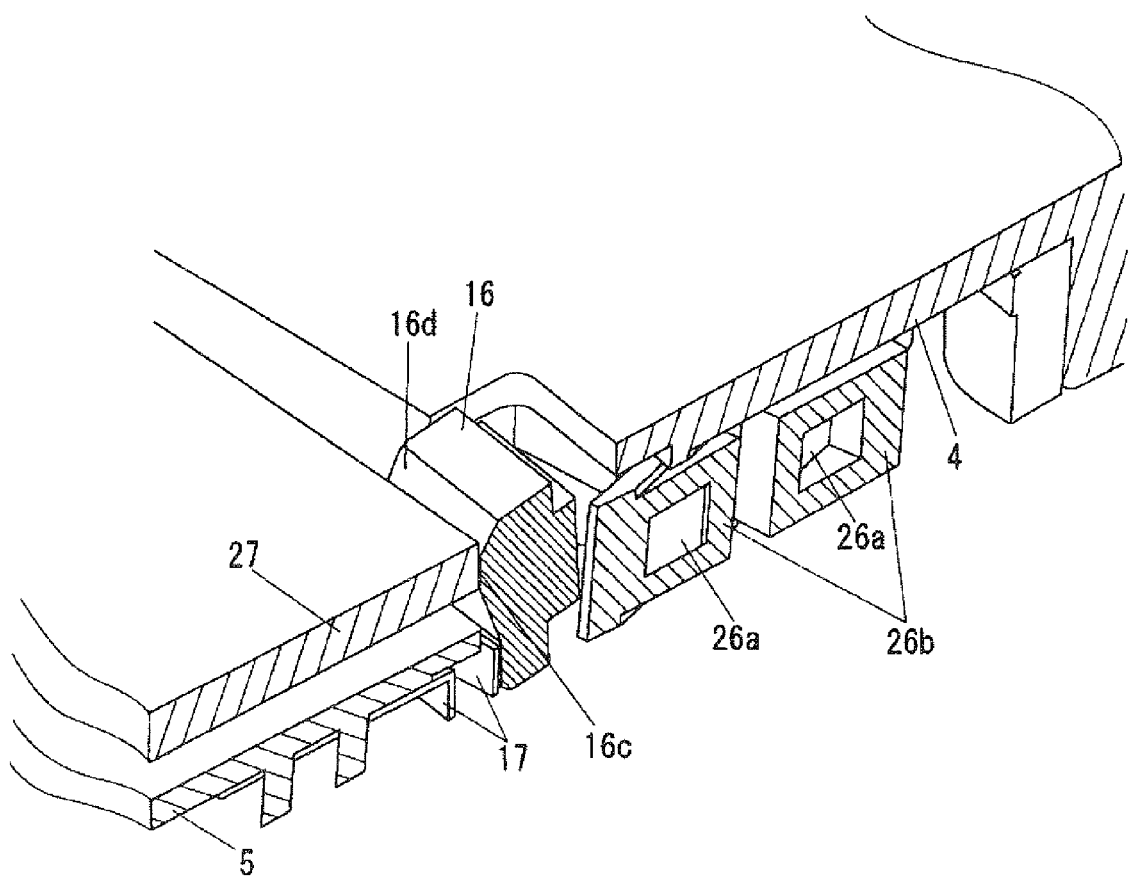
FIG. 7 is a cross sectional view for explaining operations of the optical disk rotation suppressing member in a state corresponding to FIG. 5(b) in the arrow direction taken along line X-X of FIG. 3.

FIG. 1 is an exploded perspective view of an optical disk apparatus according to a first embodiment of the present invention. FIG. 2 is an exploded perspective view of the optical disk apparatus of FIG. 1 as seen from a rear side thereof. FIG. 3 is a partial enlarged view of an optical disk rotation suppressing member and a tray receiving releasing member. FIG. 4 is an exploded perspective view of the optical disk rotation suppressing member and the tray receiving releasing member. FIGS. 5(a) and 5(b) are views for explaining operations of the optical disk rotation suppressing member and the tray receiving releasing member. FIG. 5(a) shows a state that a tray 5 is received by a latching solenoid 26, and FIG. 5(b) shows a state that the receiving is released by a fixing releasing spring 24 after the latching solenoid 26 is turned on. FIGS. 6 and 7 are cross sectional views for explaining operations of the optical disk rotation suppressing member in arrow directions taken along line X-X of FIG. 3. FIG. 6 is a cross sectional view taken in the arrow corresponding to the state of FIG. 5(a), and FIG. 7 is a cross sectional view taken in the arrow corresponding to the state of FIG. 5(b).

Referring to FIGS. 1 and 3, reference number 1 denotes an upper cover which covers an upper portion of the apparatus, and reference number 2 denotes a frame which is a base of the apparatus and has a space where internal devices and an optical disk are received.

Reference number 3 denotes a flexible board which connects a main board to an intermediate board which is connected to an external PC. Reference number 4 denotes rails which are formed between both sides of a tray 5 and the frame 2 to support the tray 5 movably with respect to the frame 2. Reference number 5 denotes the tray on which the optical disk is rotatably mounted. The tray is guided by the rail 4 to move forward and backward as a drawer with respect to the frame 2 between a mounting position where the optical disk is detachably mounted and a receiving position where the optical disk is received in the frame 2.

Reference number 6 denotes a spindle motor which rotates the optical disk. Reference number 7 denotes an optical pickup which reads information recorded on the optical disk or records information on the optical disk. Reference number 8 denotes a bezel which is disposed on a front side of the apparatus to be exposed to an outer surface of a notebook PC and constitutes a portion of a frame of the notebook PC. Reference number 9 denotes an eject button which a user uses to indicate a command for releasing tray fixing means in order to take out the tray 5 from the apparatus. Reference number 10 denotes a pickup module which includes the spindle motor 6 and the optical pickup 7 and has functions of moving the optical pickup 7 in a normal direction of the optical disk to read information from the optical disk or record information on the optical disk. Reference number 11 denotes a fixing pin which is used as a hook for fixing the tray 5 to the frame 2. Reference number 12 denotes a tray discharging element which pushes out the tray 5 from the frame 2 when the optical disk is mounted on or detached from the tray 5. Reference number 13 denotes a protection cover which is used to protect a lower portion of the tray 5. Reference number 14 denotes an electric board (main board). Reference number 15 denotes a tray cover which is disposed under the tray 5 to protect the pickup module 10 in the tray 5 and other parts.

Referring to FIG. 3, Reference number 16 denotes an optical disk rotation suppressing member which is used as a pressing member for preventing the optical disk from being discharged in a rotational state when the tray 5 is taken out from 2 during an operating state of the apparatus. Reference number 17 denotes an optical disk rotation suppressing member pressing spring which is used to exert an optical disk pressing force on the optical disk rotation suppressing member 16. Reference number 18 denotes a pressing spring fixing member which fixes the optical disk rotation suppressing member pressing spring 17 to the tray 5. Reference number 26 denotes is a solenoid called a latching solenoid which includes a magnetic circuit made of a permanent magnet and uses a suction force of the permanent magnet to maintain a suction state. In the latching solenoid 26, reference number 26a denotes a plunger, reference number 26b denotes a coil, and reference number 26c denotes the permanent magnet.

Reference number 21 denotes a fixing means which is engaged with the fixing pin 11 erected on a bottom cover to fix (receive) the tray 5 in the frame 2. Reference number 22 denotes a fixing means rotation (force exerting) spring which exerts a rotational-direction weight force on the fixing means 21. Reference number 19 denotes a fixing releasing member which pulls the plunger 26a in a direction E of FIG. 5(a) to release the receiving of the tray 5 when a current is applied to the latching solenoid 26. Reference number 24 denotes a fixing releasing spring which is used to exert a force of pulling the plunger 26a in the direction E of FIG. 5(a) on the fixing releasing member 19. Reference number 20 denotes a restoring member which contacts the fixing pin 11 to restore the fixing releasing member 19 to a fixing position when the tray 5 is inserted into the frame. Reference number 23 denotes a holding spring which is used to hold and fix the restoring member 20 to the fixing pin 11 in an accurate contact position when the tray 5 is inserted into the frame 2. Reference number 25 denotes a compulsory ejection member which is used to release the fixing of the tray 5 to the frame 2 by inserting a pin or other members from the front surface of the apparatus to rotate the member, and allowing a cam portion of a cam 25a to push a cam 21a of the fixing means 21 in an operational failure time when the tray 2 cannot be taken out from the frame 2 due to an occurrence of such an unexpected power disconnection during a sequence of a tray inserting or ejecting operation.

Referring to FIG. 4, the optical disk rotation suppressing member 16 has protrusions 16a at both sides which are used as a rotational shaft for rotation. The rotation is rotatably attached to groove 5a formed in the tray 5 to be rotated in a directional B of FIG. 4 and in a state that other members are not suppressed by the optical disk rotation suppressing member pressing spring 17 and the pressing spring fixing member 18. The optical disk rotation suppressing member 16 and the optical disk rotation suppressing member pressing spring 17 are in contact with each other at a portion D of FIG. 5(a) and are exerted by a force in the G direction of FIG. 5(b). The fixing releasing member 19 is rotatably attached to a rotational shaft formed in the tray 5, and an engagement portion 19a of the fixing releasing member is attached to be engaged with a hole of the plunger 26a of the latching solenoid 26.

Referring to FIGS. 6 and 7, FIG. 6 is a view showing a state that the tray 5 is located in an inner portion of the frame, that is, a state that the tray is retained by the tray receiving releasing member and corresponds to FIG. 5(a). FIG. 7 is a view showing a state that the tray 5 is released from the tray receiving releasing member and corresponds to FIG. 5(b). In FIGS. 6 and 7, reference numeral 27 denotes the optical disk which is mounted on the tray 5.

Here, the fixing releasing member 19, the restoring member 20, fixing means 21, the fixing means rotation (force exerting) spring 22, the hold spring 23, the fixing releasing spring 24, and the latching solenoid 26 constitutes a tray receiving releasing member which receives and releases the tray 5 at a receiving position.

In addition, as pressing members, the optical disk rotation suppressing member 16, the optical disk rotation suppressing member pressing spring 17, the pressing spring fixing member 18, and the groove 5a formed in the tray 5 are formed in an inner portion of the tray 5 and constitute an optical disk rotation suppressing member which exerts an pressing force on the optical disk 27 in cooperation with a tray ejection operation of the tray receiving releasing member and releases the pressing force in cooperation with a tray insertion operation of the tray receiving releasing member.

Hereinafter, operations of the optical disk apparatus will be described in detail with reference to FIGS. 3 to 7. In FIG. 5(a), the plunger 26a of the latching solenoid 26 is held by the permanent magnet 26c, so that the engaged fixing releasing member 19 is in a received state.

In addition, the fixing means 21 is forced to the fixing pin 11 by the fixing means rotation (force exerting) spring 22, and the tray 5 is received in a receiving position in an inner portion of the frame. In this state, a cam 19b of the fixing releasing member 19 exerts a rotational force on a cam 16b of the optical disk rotation suppressing member 16 in a direction where a pressing force is not generated on the optical disk 27 in FIGS. 6 and 7, that is, in a direction C of FIG. 4, so that the optical disk rotation suppressing member 16 is engaged with the optical disk rotation suppressing member pressing spring 17 which generates a force in a direction of pressing the optical disk 27.

In this state, since the optical disk rotation suppressing member 16 does not contact the optical disk 27, the optical disk 27 can be rotated by the spindle motor 6. As a result, playback and record operations of the optical disk 27 can be performed.

In this state, when the user mounts the optical disk 27 or exchanges the optical disks 27, the user pushes the eject button 9. Due to the operation, a power is supplied from a personal computer to the latching solenoid 26 of the optical disk apparatus through the main board 14, and a magnetic field is generated to the coil 26b in a direction where a magnetic field of the permanent magnet 26c is cancelled.

Next, the plunger 26a is pulled by the fixing releasing spring 24 in a direction H of FIG. 5(b), so that the fixing releasing member 19 engaged with the plunger 26a is rotated in a direction F. And, the engagement portion 19a of the fixing releasing member 19 pushes the contacting portion 21b of the fixing means 21 to be rotated in a direction I of FIG. 5(b), so that the receiving of the tray 5 to the fixing pin 11 is released.

At the same time, the engagement of the cam 19b of the fixing releasing member 19 and the cam 16a of the optical disk rotation suppressing member 16 is released, so that the optical disk rotation suppressing member 16 is rotated in a direction B of FIG. 4 by the optical disk rotation suppressing member pressing spring 17. And, as shown in FIG. 7, the contact portion 16c of the optical disk rotation suppressing member 16 is in contact with an end surface of the optical disk 27, so that the rotation of the optical disk 27 is compulsorily stopped. After that, the tray 5 is ejected from the frame 2 by a tray moving means (not shown), and the optical disk 27 is directed to a detachable mounting position.

In addition, the optical disk rotation suppressing member 16 has a slant portion 16d having a slant. Therefore, when the optical disk 27 at the mounting position is attached on the spindle motor 6 in the tray 5, although the optical disk 27 contacts the optical disk rotation suppressing member 16, the optical disk rotation suppressing member 16 is rotated in the direction C of FIG. 4, so that the optical disk 27 can be smoothly mounted.

After the optical disk 27 is mounted, the tray 5 is inserted into the frame 2. Namely, when the optical disk apparatus is in an operable state, if the tray 5 is in a state that the tray is ejected from the frame 2, the fixing pin 11 is located at a position of the fixing pin 11a in FIG. 5(b), and during the moving of the tray 5 into the frame 2, the fixing pin 11a contacts the contacting portion 20a of the restoring member 20 to be rotated in a direction of FIG. 5(b), so that the aforementioned fixing releasing member 19 is pushed in a direction F of FIG. 5(b). After the plunger 26a reaches a position where it is fixed by the permanent magnet 26c, the contact of the fixing pin 11 and the restoring member 20 is finished. In the operation, since the force of the engagement portion 19a of the fixing releasing member 19 to the contacting portion 21b is released, the fixing means 21 is rotated in a reverse direction of a direction I of FIG. 5(b) by the fixing means rotation (force exerting) spring 22 to be in a state that the fixing means contacts the fixing pin 11, so that the fixing of the tray 5 to the receiving position is completed.

In the embodiment, the optical disk rotation suppressing member 16 is constructed as a member which has the rotational shaft 16a to rotate about the groove 5a formed in the tray 5. However, a member which moves in a horizontal direction with respect to the end surface of the optical disk 27 may be formed with the same construction.

Second Embodiment

Figure 8:
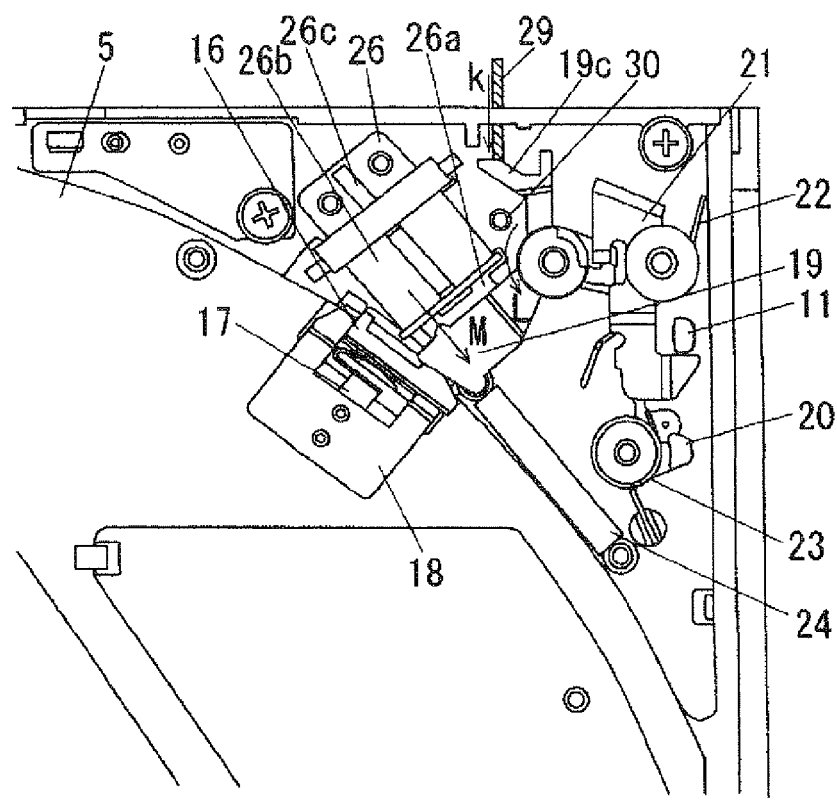
Figure 8:
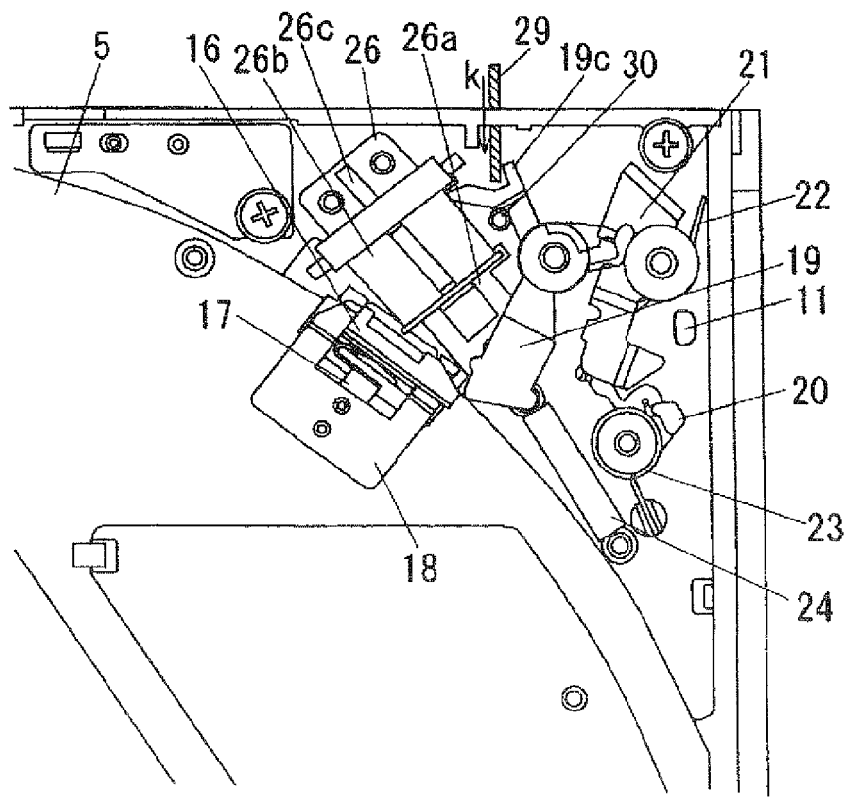

FIGS. 8(a) and 8(b) are views for explaining operations of an optical disk rotation suppressing member and a tray receiving releasing member of an optical disk apparatus according to a second embodiment of the present invention. FIG. 8(a) shows a state that a tray 5 is received by a latching solenoid 26, and FIG. 8(b) shows a state that the receiving is released by a fixing releasing spring 24 after the latching solenoid 26 is turned on.

In FIGS. 8(a) and 8(b), all the components are the same as the aforementioned embodiment except a fixing releasing member 19, a tray 5, and a compulsory ejection pin 29. Reference number 30 denotes a rotation restriction pin which formed as an integral part of the tray 5 or a separate part attached to the tray 5 and allows the fixing releasing member 19 not to rotate beyond a predetermined position. A contacted portion 19c of the fixing releasing member 19 is a cam which is formed as an integral part of a fixing releasing means to allow the fixing releasing member 19 to rotate in a direction L of FIG. 8(b) when the compulsory ejection pin 29 is inserted from a front portion of the tray.

As described in the first embodiment, in an operational failure time when the tray 2 cannot be taken out from the frame 2 due to an occurrence of such an unexpected power disconnection during a sequence of a tray inserting or ejecting operation, the compulsory ejection pin 29 is inserted from the front portion of the tray 5 in a direction K of the figure in order to compulsorily take out the tray 5, so that the compulsory ejection pin 29 contacts the contacted portion 19c of the fixing releasing member 19. In this state, the compulsory ejection pin 29 is pushed in the direction K from the state of FIG. 8(a) to the state of FIG. 8(b) to rotate the fixing releasing member 19 in a direction L of FIG. 8(b). Therefore, the plunger 26a engaged with the fixing releasing member 19 is also pulled in a direction M of FIG. 8(b), and when a pulling force exceeds a force corresponding to a suction force generated between the permanent magnet 26c and the plunger 26a subtracted by a weight force of the fixing releasing spring 24, the fixing of the plunger 26a by the permanent magnet 26 is released, so that the receiving of the tray 5 to the frame is released as described in the aforementioned embodiment. The operations of the optical disk rotation suppressing member 16 are the same as those of the first embodiment. In addition, since the operations of restoration from the fixing releasing state to the fixing state are the same as those of the first embodiment, description thereof is omitted.

According to the embodiment, it is possible to provide an optical disk apparatus capable of having a thickness of 9.5 mm or less by disposing the optical disk rotation suppressing member in an inner portion of the tray and safely taking out the optical disk when the optical disk is compulsorily taken out in a time that the optical disk apparatus is in disorder.

Third Embodiment

The basic construction of an optical disk apparatus according to a third embodiment is similar to that of the first embodiment. Therefore, FIG. 1 of the first embodiment is used as an exploded perspective view of the optical disk apparatus, and FIG. 2 of the first embodiment is used as an exploded perspective view of the optical disk apparatus as seen from a rear side thereof.

Figure 9:
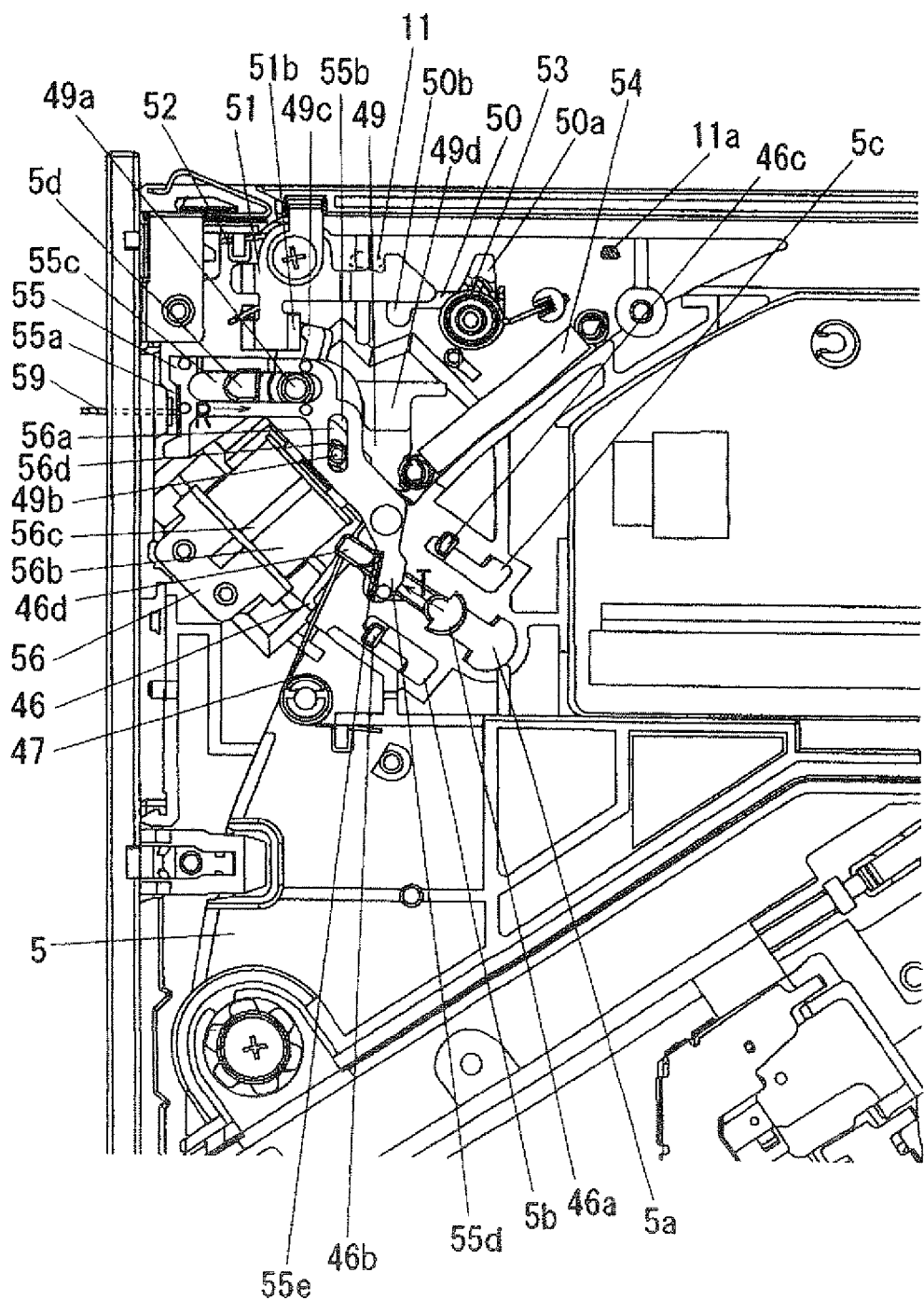
FIG. 9 is a view for explaining operations of an optical disk rotation suppressing member and a tray receiving releasing member according to a third embodiment of the present invention and showing a state that a tray is received by a latching solenoid.
Figure 10:
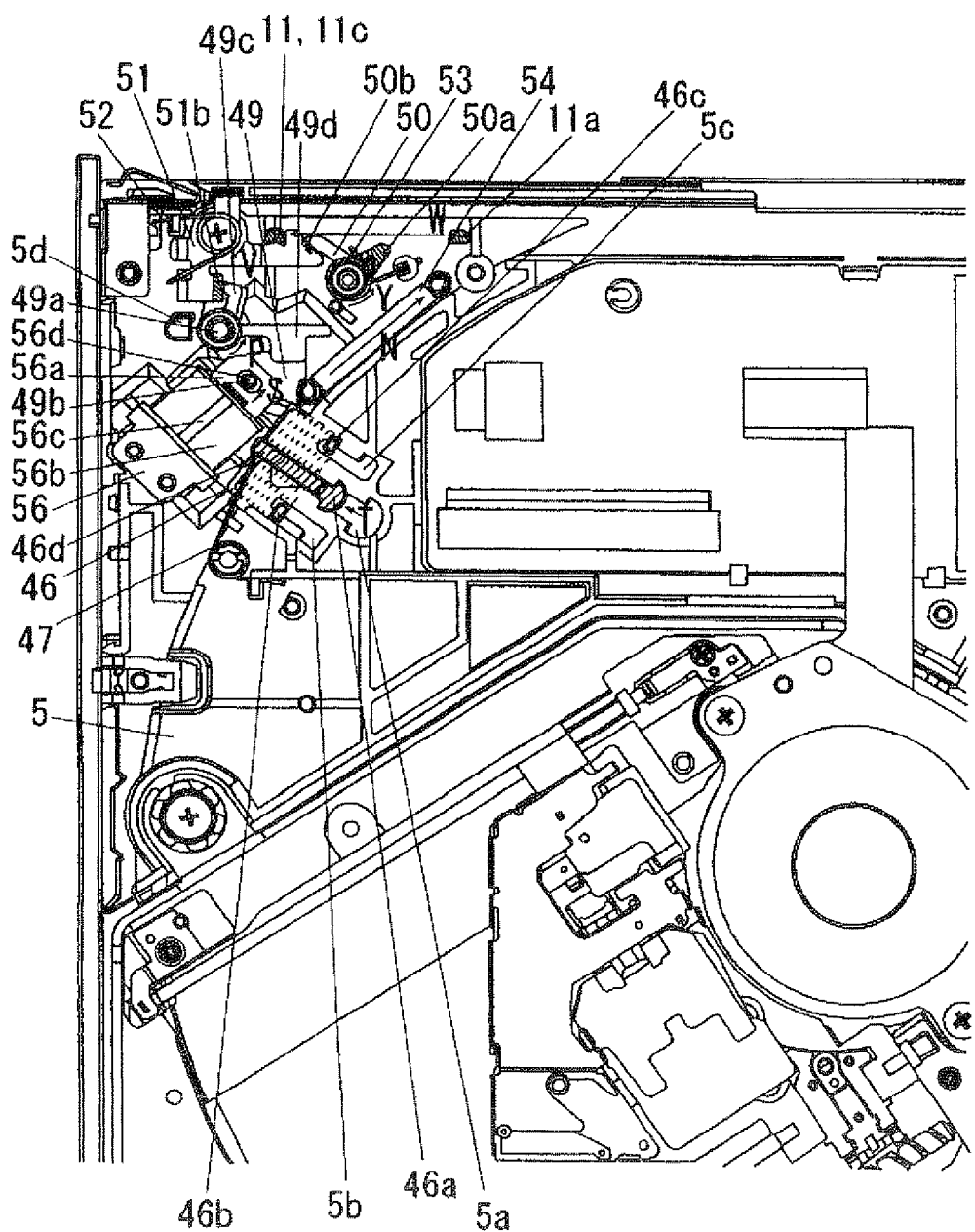
FIG. 10 is a view showing a construction shown in FIG. 9 excluding an eject lever.
Figure 11:
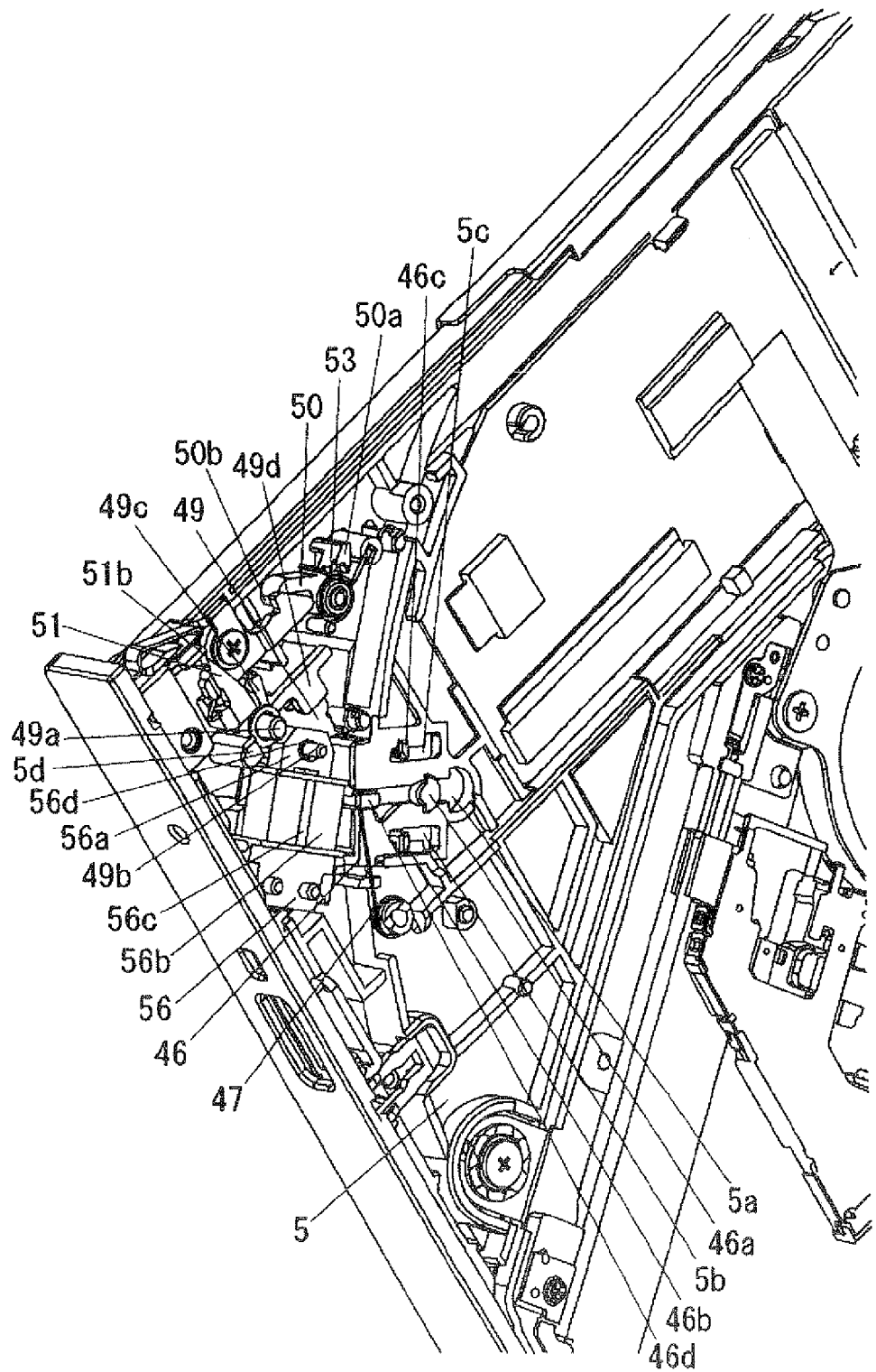
FIG. 11 is a perspective view corresponding to FIG. 10.
Figure 12:
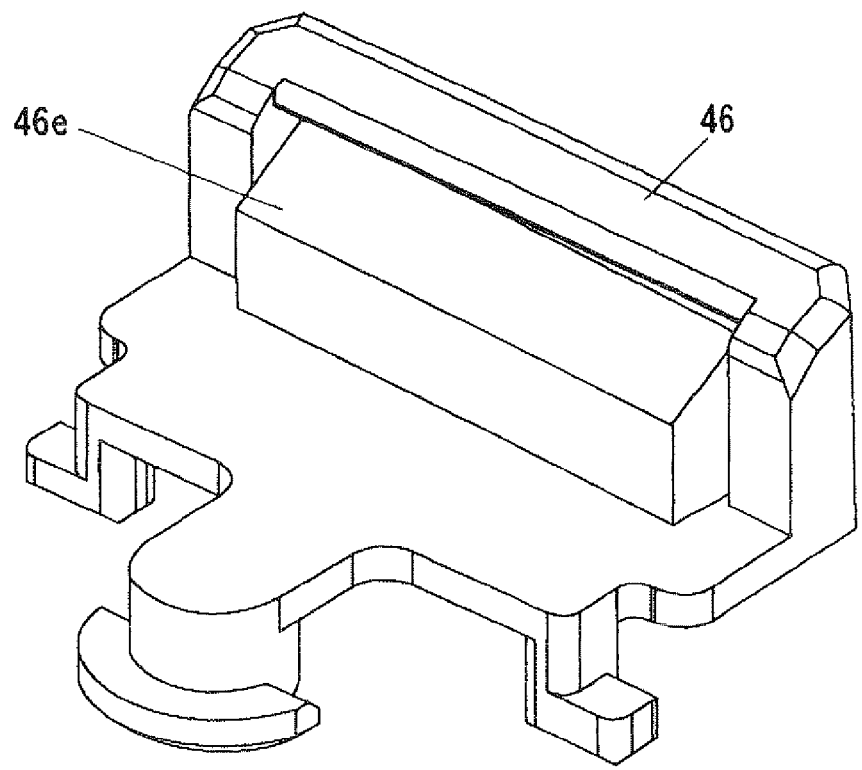
FIG. 12 is a perspective view of the optical disk rotation suppressing member according to the third embodiment.

FIG. 9 is a view for explaining operations of an optical disk rotation suppressing member and a tray receiving releasing member according to a third embodiment of the present invention and showing a state that a tray 5 is received by a latching solenoid 56. FIG. 10 is a view showing a construction shown in FIG. 9 excluding an eject lever 55. FIG. 11 is a perspective view corresponding to FIG. 10. FIG. 12 is a perspective view of the optical disk rotation suppressing member according to the third embodiment.

Figure 13:
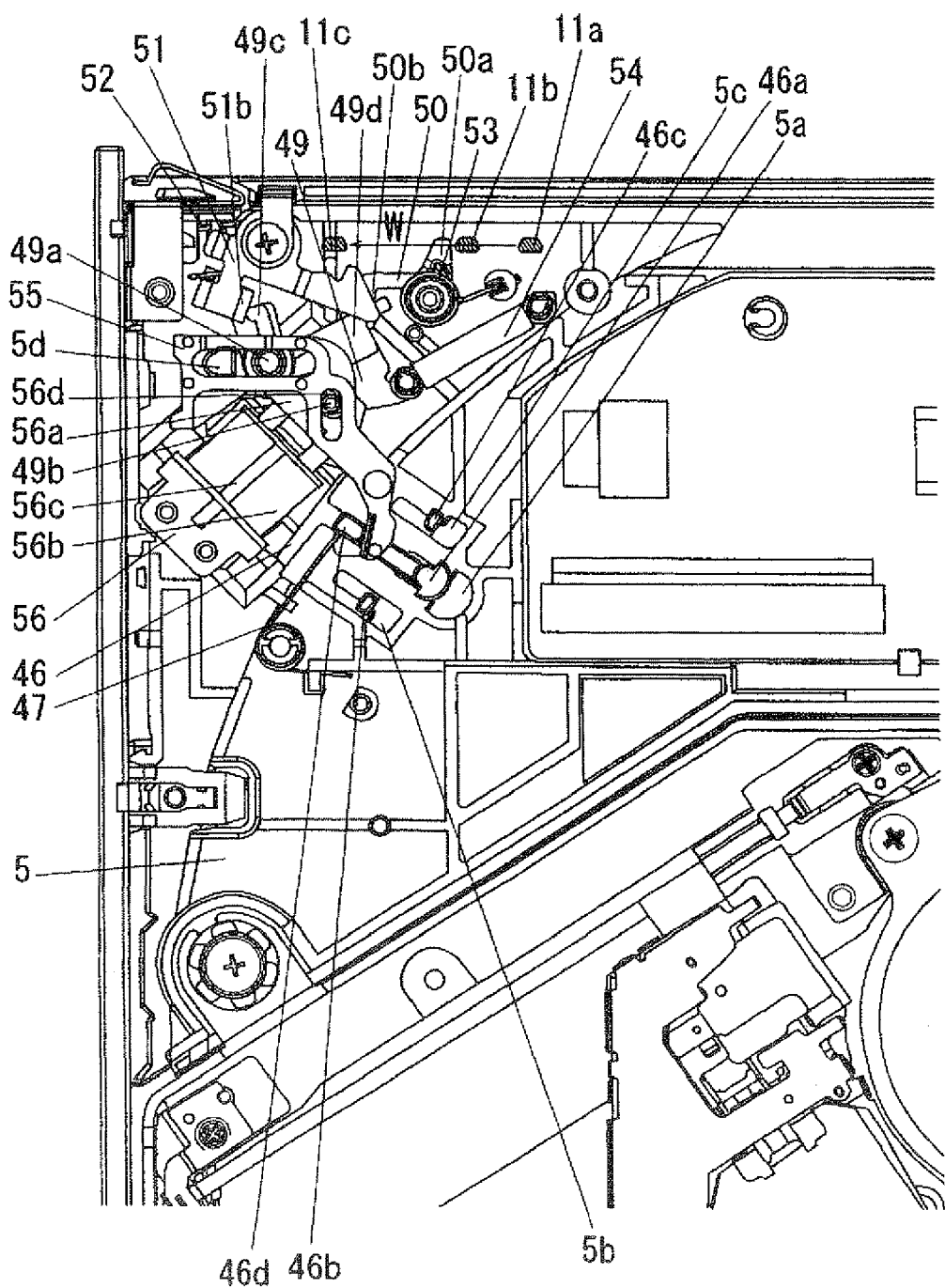
FIG. 13 is a view for explaining operations of the optical disk rotation suppressing member and the tray receiving releasing member according to the embodiment of the present invention and showing a state that a receiving of a tray by a fixing releasing spring is released after the latching solenoid is turned on or after the tray is compulsorily ejected.
Figure 14:
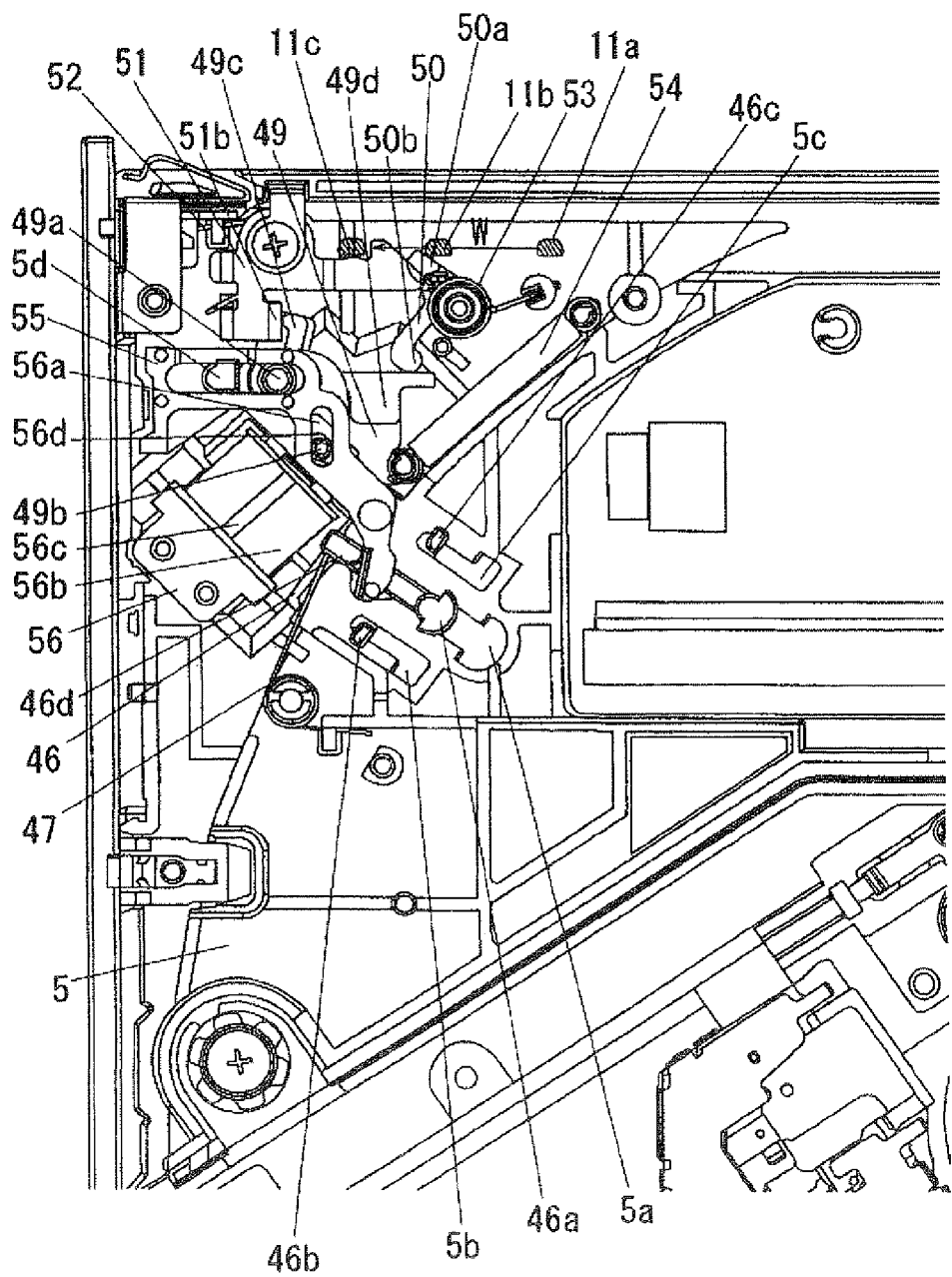
FIG. 14 is a view for explaining operations of the optical disk rotation suppressing member and a tray receiving releasing member according to the embodiment of the present invention and showing a state that the tray is inserted into the frame.
Figure 15:
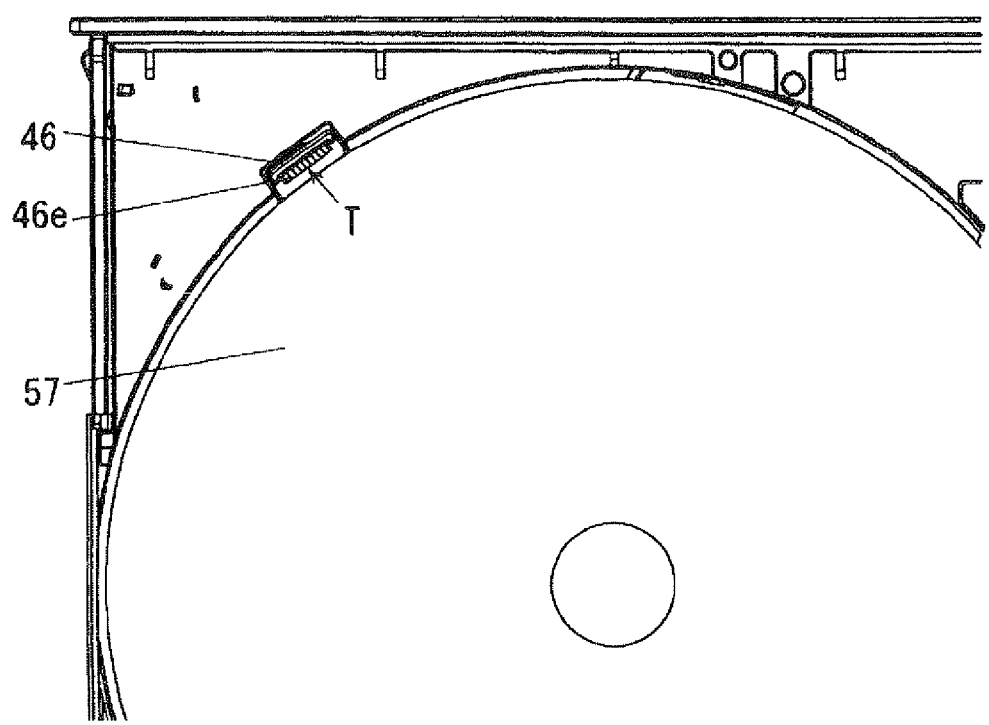
FIG. 15 is a view for explaining the operation of the optical disk rotation suppressing member and a view as seen from a rear side of FIGS. 9 to 11.
Figure 16:
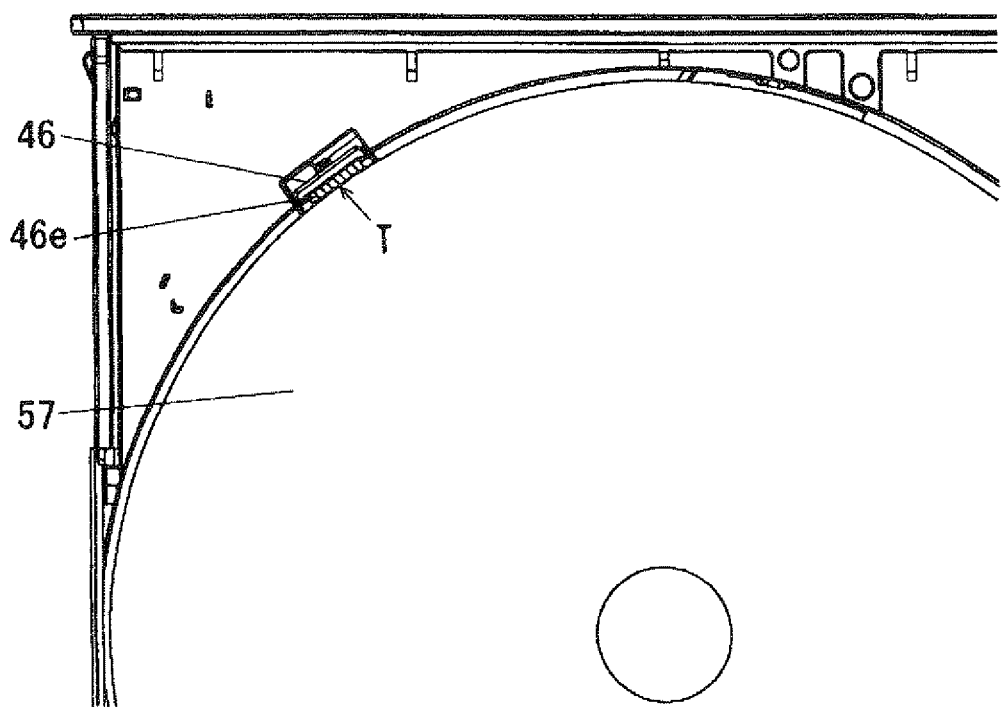
FIG. 16 is a view for explaining the operation of the optical disk rotation suppressing member and a view as seen from a rear side of FIG. 13.
Figure 17:
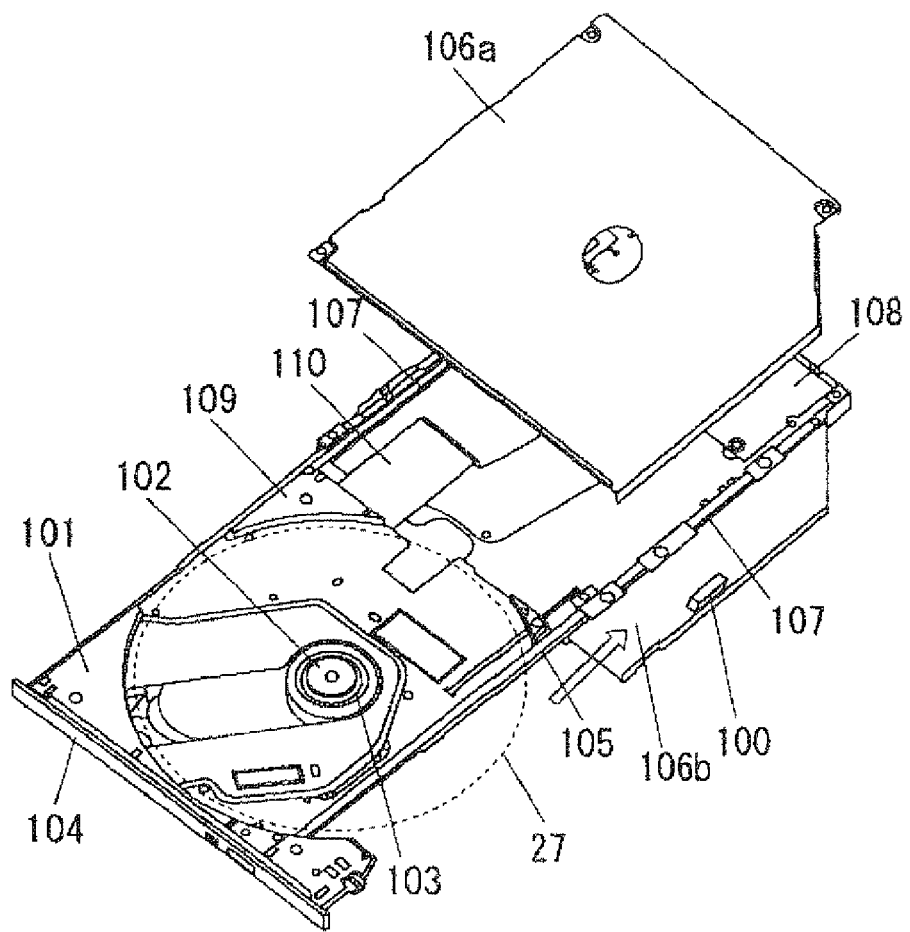
FIG. 17 is an exploded perspective view of a conventional drawer-type disk apparatus.
Figure 18:
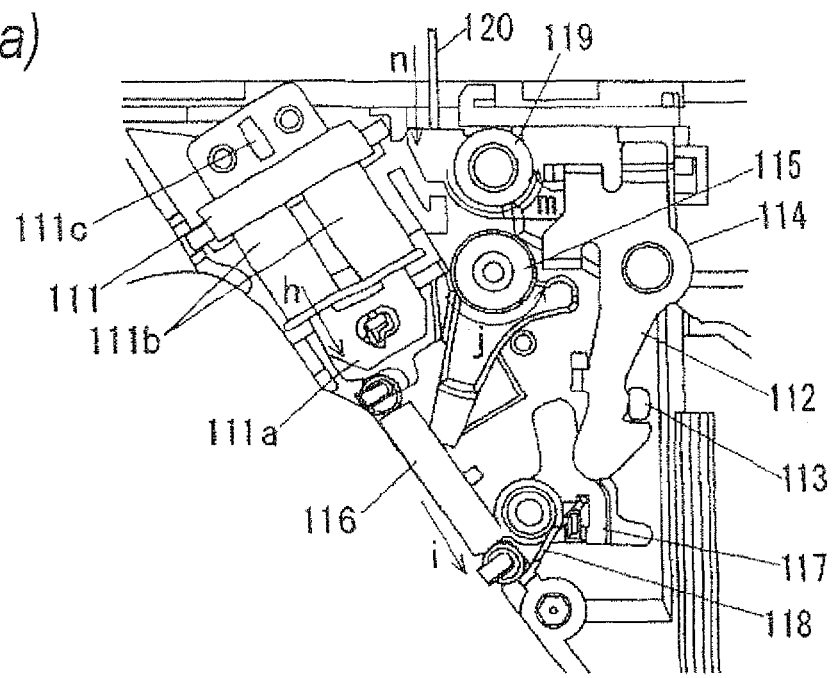
FIG. 18(*a*) is a view showing a state that a tray of the conventional optical disk apparatus is received, and FIG. 18(*b*) is a view showing a state that the receiving of the tray of the conventional optical disk apparatus is released.
Figure 18:
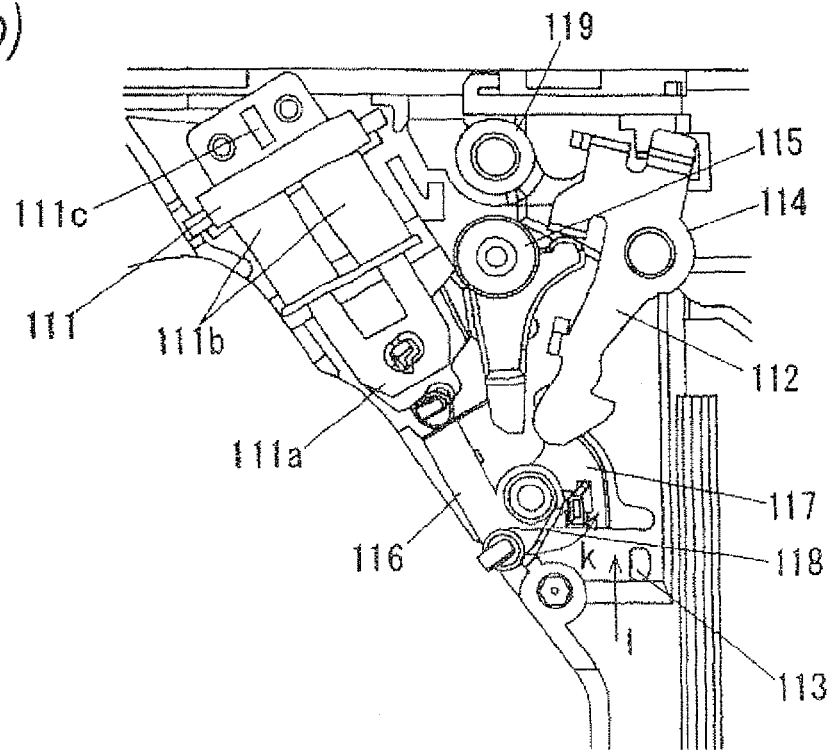

FIG. 13 is a view for explaining operations of the optical disk rotation suppressing member and the tray receiving releasing member according to the embodiment of the present invention and showing a state that a receiving of a tray by a fixing releasing spring 54 is released after the latching solenoid 56 is turned on or after the tray is compulsorily ejected. FIG. 14 is a view for explaining operations of the optical disk rotation suppressing member and a tray receiving releasing member according to the embodiment of the present invention and showing a state that the tray 5 is inserted into the frame 2. FIG. 15 is a view for explaining the operation of the optical disk rotation suppressing member and a view as seen from a rear side of FIGS. 9 to 11. FIG. 16 is a view for explaining the operation of the optical disk rotation suppressing member and a view as seen from a rear side of FIG. 13. In FIGS. 15 and 16, reference numeral 57 denotes an optical disk mounted on the tray 5.

In FIGS. 9 to 16, reference number 46 denotes an optical disk rotation suppressing member which is used as a pressing member for preventing the optical disk from being discharged in a rotational state when the tray 5 is taken out from 2 during an operating state of the apparatus. Reference number 47 denotes an optical disk rotation suppressing member pressing spring which is used to exert an optical disk pressing force on the optical disk rotation suppressing member 46. Reference number 56 denotes is a solenoid called a latching solenoid which includes a magnetic circuit made of a permanent magnet and uses a suction force of the permanent magnet to maintain a suction state. The latching solenoid 56 is operated through electrical control when an eject button 9 of FIG. 1 is pushed. In the latching solenoid 56, reference number 56a denotes a plunger, reference number 56b denotes a coil, and reference number 56c denotes the permanent magnet.

Reference number 51 denotes a fixing means which is engaged with the fixing pin 11 erected on a bottom cover at a position 11c of FIG. 10 to fix (receive) the tray 5 in the frame 2. Reference number 52 denotes a fixing means rotation (force exerting) spring which exerts a rotation-direction weight force on the fixing means 51. Reference number 49 denotes a fixing releasing member which pulls the plunger 56a in a direction N of FIGS. 9, 10, and 13 to release the receiving of the tray 5 when a current is applied to the latching solenoid 56. Reference number 54 denotes a fixing releasing spring which is used to exert a force of pulling the plunger 56a in the direction N of FIGS. 9, 10, and 13 on the fixing releasing member 49. Reference number 50 denotes a restoring member which contacts the fixing pin 11 to restore the fixing releasing member 49 to a fixing position when the tray 5 is inserted into the frame. In general, the restoring member has as a center position a position shown in FIGS. 9 and 14 where the restoring member accurately contacts the fixing pin 11 by the holding spring 53, and the restoring is attached to be rotated from the center position in a direction Y or in a reverse direction thereof. Reference number 53 denotes a holding spring which is used to hold and fix the restoring member 50 to the fixing pin 11 in an accurate contact position when the tray 5 is inserted into the frame 2. Reference number 55 denotes a part of a later-described tray receiving releasing member and an eject lever functioning as a compulsory ejection member which rotates the fixing releasing member 49 in a direction P of FIG. 10 by a force from the compulsory ejection pin 59 to a contacted portion 55a when the compulsory ejection pin 59 is inserted from a front portion of the tray and as a rotation suppressing operation means (in the third embodiment, a pressing force exertion releasing member for releasing a force used to exert a pressing force on the optical disk rotation suppressing member 46 to the optical disk 57) which operates the optical disk rotation suppressing member 46 in a direction where the rotation of the optical disk 57 is suppressed. A release arm 49b formed to be integrated into the fixing releasing member 49 is engaged with inner portions of an elliptic hole 55b of the eject lever 55 and a hole 56d of the plunger 56a. A rotational shaft 49a of the fixing releasing member 49 formed in the tray 5 and a protrusion 5d formed in the tray 5 are engaged with the elliptic hole 55c of the eject lever 55. As a result, the eject lever 55 can be horizontally moved in a direction R of FIG. 9 or in a reverse direction thereof.

Referring to FIGS. 9, 10, 12, and 13, protrusions 46a to 46c are formed in the optical disk rotation suppressing member 46. The protrusions 46a and 46d are engaged with an inner portion of the groove 5a. The protrusion 46b is engaged with an inner portion of the groove 5b. The protrusion 46c is engaged with an inner portion of the groove 5c. The protrusions 46a to 46d can horizontally move along the inner portion of the grooves 5a to 5c formed in the tray 5, respectively. The optical disk rotation suppressing member 46 and the optical disk rotation suppressing member pressing spring 47 are contacted at the protrusion 46d and forced in a direction T of FIGS. 9, 10, 13, 15, and 16. The fixing releasing member 49 is rotatably attached to the rotational shaft 49a formed in the tray 5, and the release arm 49b of the fixing releasing member 49 is engaged with the hole 56d of the plunger 56a of the latching solenoid 56 and the elliptic hole 55c of the eject lever 55.

In the third embodiment, the fixing releasing member 49, the restoring member 50, the fixing means 51, the fixing means rotation (force exerting) spring 52, the hold spring 53, the fixing releasing spring 54, the latching solenoid 56, and the eject lever 55 constitute a tray receiving releasing member which receives and releases the tray 5 at a receiving position.

In addition, in the third embodiment, the optical disk rotation suppressing member 46, the optical disk rotation suppressing member pressing spring 47, the eject lever 55, and the grooves 5a to 5d formed in the tray 5 are formed in an inner portion of the tray 5 and constitute an optical disk rotation suppressing member which exerts an pressing force on the optical disk 57 in cooperation with a tray ejection operation of the tray receiving releasing member and releases the pressing force in cooperation with a tray insertion operation of the tray receiving releasing member.

In addition, in the third embodiment, the eject lever 55 functions as a compulsory ejection member for rotating the fixing releasing member 49 in a direction P of FIG. 10 by using an operational force from the compulsory ejection pin 59 to the contacted portion 55a when the compulsory ejection pin 59 is inserted from the front surface of the tray. Therefore, the tray receiving member including the eject lever 55 as a part thereof also functions as a compulsory ejection ember.

In addition, the optical disk rotation suppressing member according to the third embodiment exerts a pressing force on the optical disk 57 in cooperation with the eject lever 55 functioning as a part of the compulsory ejection member and remove the pressing force from the optical disk in cooperation with the compulsory ejection restoring operation of the eject lever 55. In other words, the eject lever 55 functioning as a part of the optical disk rotation suppressing member has a function as a rotation suppressing operation member for operating the optical disk rotation suppressing member in a rotation suppressing direction, that is, a pressing force exertion releasing member for releasing a force used to exert a pressing force on the optical disk rotation suppressing member to the optical disk.

Therefore, the eject lever 55 functioning as a part of the compulsory ejection member has a function as a part of the tray receiving element and the rotation suppressing operation member (pressing force exertion means).

Hereinafter, the operations of the optical disk apparatus will be described in detail with reference to FIGS. 9 to 16. In FIGS. 9 to 11, the plunger 56a of the latching solenoid 56 is held by the permanent magnet 56c, so that the engaged fixing releasing member 49 is in a received state.

In addition, the fixing means 51 is forced to the fixing pin 11 by the fixing means rotation (force exerting) spring 52, and the tray 5 is received at a receiving position in an inner portion of the frame. In this state, the hook portion 55a of the eject lever 55 contacts the protrusion 46d of the optical disk rotation suppressing member 46 at the end portion 55e thereof, and the optical disk rotation suppressing member 46 is held at a position so as not contact the optical disk 57 of FIG. 15, so that the optical disk rotation suppressing member 46 is engaged with the optical disk rotation suppressing member pressing spring 47 which generates a force in a direction of pressing the optical disk 57, that is, a reverse direction of a direction T of FIGS. 9, 10, and 15.

In this state, since the optical disk rotation suppressing member 46 does not contact the optical disk 57, the optical disk 57 can be rotated by the spindle motor 6. As a result, playback and record operations of the optical disk 57 can be performed.

In this state, when the user mounts the optical disk or exchanges the optical disks, the user generally pushes the eject button 9. Due to the operation, a power is supplied from a personal computer to the latching solenoid 56 of the optical disk apparatus through the main board 14, and a magnetic field is generated to the coil 56b in a direction where a magnetic field of the permanent magnet 56c is cancelled.

Next, the plunger 56a is pulled by the fixing releasing spring 54 in a direction S of FIGS. 9 and 10, so that the fixing releasing member 49 engaged with the of the hole 56d of the plunger 56a is rotated in a direction F by the release arm 49b. And, the engagement portion 49e of the fixing releasing member 49 pushes the contact portion 51b of the fixing means 51 to be rotated in a direction V of FIGS. 9 and 10, so that the receiving of the tray 5 to the fixing pin 11 is released as shown in FIG. 13.

At the same time, the eject lever 55 engaged with the release arm 49b of the fixing releasing member 49 by the elliptic hole 55*b* is horizontally moved in a direction R of FIGS. 9 and 13. The hook portion 55*b* of the eject lever 55 is also moved in the direction R of FIGS. 9 and 13. As a result, the optical disk rotation suppressing member 46 is horizontally moved in a reverse direction of the direction T of FIGS. 9, 10, 13, 15, and 16 by the optical disk rotation suppressing member pressing spring 47 so as to be in a state of FIGS. 13 and 16. Therefore, the contact portion 46*e* of the optical disk rotation suppressing member 46 is in contact with an end surface of the optical disk 57, so that the rotation of the optical disk 57 is compulsorily stopped. After that, the tray 5 is ejected from the frame 2 by a tray moving means (not shown), and the optical disk 57 is directed to a detachable mounting position. At this time, the fixing pin 11 is moved in a reverse direction of the direction W, and during the moving, contacts the contacting portion 50*a* of the restoring member 50. Since the restoring member 50 is rotatably disposed from the position in a direction Y or in a reverse direction thereof by the holding spring 53, the restoring member is rotated in the reverse direction of the direction Y by a force when the fixing pin 11 is contacted, so that the fixing pin 11 is moved in the reverse direction of the direction W to release the contacting state. After that, the restoring member is rotated in the direction Y so as to be restored again at a position shown in FIG. 9, that is, the center position thereof.

The contact portion 46*e* of the optical disk rotation suppressing member 46 has an arbitrary angle with respect to a tangential direction of the end portion of the optical disk 57, and an opposite surface thereof is directed in the rotational direction of the optical disk 57 with respect to the end portion of the optical disk 57, so that the contact portion is disposed to be close thereto. Therefore, when the optical disk 57 at the mounting position in a state of FIGS. 13 and 16 is attached on the spindle motor 6 in the tray 5, although the optical disk 57 contacts the optical disk rotation suppressing member 46, the optical disk rotation suppressing member 46 is horizontally rotated in the direction T of FIGS. 9, 10, 13, 15, and 16, so that the optical disk 57 can be smoothly mounted. In addition, when the tray 5 is ejected from the frame 2 to a position where the optical disk 57 is detachably mounted, the rotation of the optical disk 57 can be stopped without abnormal sound.

After the optical disk 57 is mounted on the mounting position in a state of FIGS. 13 and 16, the tray 5 is inserted into the frame 2. Namely, when the optical disk apparatus is in an operable state, if the tray 5 is in a state that the tray is ejected from the frame 2, the fixing pin 11 is located at a position of the fixing pin 11*a* in FIGS. 9, 10, and 13, and during the moving of the tray 5 into the frame 2, the fixing pin 11*a* is moved in the direction W of FIGS. 9, 10, and 13 to contact the contacting portion 50*a* of the restoring member 50. Since the restoring member 50 is rotatably disposed from the position in the direction Y or in the reverse direction thereof by the holding spring 53, the restoring member is rotated in the reverse direction of the direction Y by a force when the fixing pin 11 is contacted at a position 11*b* of FIG. 14, so that the fixing pin 11 is moved in the direction W to release the contacting state. After that, the restoring member is rotated in the reverse direction of the direction Y so as to be restored again at a position shown in FIGS. 9 and 13, that is, the center position thereof. At this time, the engagement portion 50*b* of the restoring member 50 contacts the restoring arm 49*d* formed as an integral part of the fixing releasing member 49 to rotate the restoring arm 49*d*, the fixing releasing member 49, and an engagement portion 49*c* formed as an integral part of the fixing releasing member 49 in a reverse direction of a direction P of FIG. 10. At this time, the plunger 56*a* engaged with the release arm 49*b* of the fixing releasing member 49 is pulled in a reverse direction of a direction S of FIGS. 9, 10, and 13 to reach a position where the plunger is fixed by the permanent magnet 56*c*. At this time, after the contacting state of the fixing pin 11 to the restoring member 50 is released, the position 11*c* is moved excessively in the direction W, so that the fixing pin 11 is separated from the restoring member 50 and restored in the reverse direction of the direction W again. In the operation, since the force of the engagement portion 49*c* of the fixing releasing member 49 to the contacting portion 21*b* is released, the fixing means 51 is rotated in a reverse direction of a direction V of FIGS. 9, 10, and 13 by the fixing means rotation (force exerting) spring 52 to be in a state that the fixing means contacts the fixing pin 11, so that the fixing of the tray 5 to the receiving position is completed.

At the same time, the eject lever 55 engaged with the release arm 49*b* of the fixing releasing member 49 by the elliptic hole 55*b* is horizontally moved in a reverse direction of the direction R of FIGS. 9 and 13, and the hook portion 55*d* of the eject lever 55 is moved in the reverse direction of the direction R of FIGS. 9 and 13. As s result, the optical disk rotation suppressing member 46 is horizontally moved in the direction T of FIGS. 9, 10, 13, 15, and 16 by the optical disk rotation suppressing member pressing spring 47 so as to be in a state of FIGS. 9 to 13 and 15. Therefore, the contact portion 46*e* of the optical disk rotation suppressing member 46 is separated from the end surface of the optical disk 57.

In this state, since the optical disk rotation suppressing member 46 does not contact the optical disk 57, the optical disk 57 can be rotated by the spindle motor 6. As a result, playback and record operations of the optical disk 57 can be performed.

In an operational failure time when the tray 5 cannot be taken out from the frame 2 due to an occurrence of such an unexpected power disconnection during a sequence of a tray inserting or ejecting operation, the compulsory ejection pin 59 is inserted from the front portion of the tray 5 in a direction substantially equal to the direction R of FIGS. 9 and 13 in order to compulsorily take out the tray 5, so that the compulsory ejection pin 59 contacts the contacted portion 49*c* of the fixing releasing member 49. In this state, the compulsory ejection pin 59 is pushed in an direction substantially equal to the direction R from the state of FIG. 9 to the state of FIG. 13 to horizontally move the eject lever 55 in the direction R of FIGS. 9 and 13. Therefore, the plunger 56*a* engaged with the release arm 49*a* of the fixing releasing member 49 is also pulled in the direction S of FIGS. 9, 10, and 13, and when a pulling force exceeds a force corresponding to a suction force generated between the permanent magnet 56*c* and the plunger 56*a* subtracted by a weight force of the fixing releasing spring 54, the fixing of the plunger 56*a* by the permanent magnet 56*c* is released. In addition, at the same time, since the fixing releasing member 49 is also rotated in a direction P of FIG. 10, the same state as those of the FIGS. 13 and 16 is obtained, so that the receiving of the tray 5 to the frame is released similar to a case where the eject button 9 is pushed.

The operations of the eject lever 55 or the optical disk rotation suppressing member 46 involved with such operations are the same as those in the aforementioned case where the eject button is pushed. In addition, the restoring operation from the fixing releasing state to the fixing state is the same as that of the aforementioned state where the eject button 9 is pushed, and thus, detailed description thereof is omitted.

In the third embodiment, the optical disk rotation suppressing member 46 is described as a member of horizontally moving with respect to the optical disk 57. However, the optical disk rotation suppressing member 46 may be constructed with a member mounted on a groove where rotational shaft having both sides is formed on the tray 5 to rotate on the end surface of the optical disk 57.

According to the embodiment, it is possible to provide an optical disk apparatus capable of having a thickness of 9.5 mm or less by disposing the optical disk rotation suppressing member in an inner portion of the tray and safely taking out the optical disk when the optical disk is compulsorily taken out in a time that the optical disk apparatus is in disorder.

The present invention may be used for an optical disk apparatus which needs to be formed to be thin.

This application based upon and claims the benefit of priority of Japanese Patent Application No2005-202756 filed on 05/07/12, Japanese Patent Application of the No2006-082309 filed on 06/03/24, the contents of which are incorporated herein by reference in its entirety.

What is claimed is:

1. An optical disk apparatus, comprising:
   a frame that receives internal devices and is structured to receive an optical disk;
   a tray that rotatably mounts the optical disk thereon;
   a rail that supports the tray to be movable between a mounting position where the optical disk is detachably mounted and a receiving position where the optical disk is received in the frame;
   a tray receiving releasing member that releases the tray from the frame; and
   an optical disk rotation suppressing member that exerts a pressing force on a circumferential portion of the optical disk in cooperation with a releasing operation of the tray receiving releasing member to stop rotation of the optical disk,
   wherein the tray receiving releasing member includes:
   a fixing releasing member which releases fixing of the tray and the frame; and
   a latching solenoid that maintains the receiving position by a suction force of a permanent magnet to a metal piece, and
   wherein the tray receiving releasing member includes a compulsory ejection member that removes the suction force by exerting a compulsory force on the fixing releasing member to release the receiving position.

2. The optical disk apparatus according to claim 1, wherein the optical disk rotation suppressing member releases the pressing force in cooperation with the receiving operation of the tray receiving releasing member.

3. The optical disk apparatus according to claim 1, wherein the tray receiving releasing member functions as a rotation suppressing operation member that suppresses a rotational force of the optical disk by the optical disk rotation suppressing member pressing the circumferential portion of the optical disk in a central direction of the optical disk.

4. The optical disk apparatus according to claim 1, wherein the tray receiving releasing member functions as a pressing force exertion releasing member that removes a force used for operating the optical disk rotation suppressing member in a direction where the rotational force of the optical disk is suppressed.

5. The optical disk apparatus according to claim 1, wherein the tray receiving releasing member functions as a pressing force exertion releasing member that removes a force used for allowing the optical disk rotation suppressing member to exert the pressing force on the optical disk.

6. The optical disk apparatus according to claim 5, wherein the eject lever is constructed to move in a direction substantially equal to a direction of a force that is exerted on the compulsory ejection member.

7. The optical disk apparatus according to claim 1, wherein a thickness of the frame constituting a thickness of the optical disk apparatus is 9.5 mm or less.

8. An optical disk apparatus, comprising:
   a frame that receives internal devices and is structured to receive an optical disk;
   a tray that rotatably mounts the optical disk thereon;
   a rail that supports the tray to be movable between a mounting position where the optical disk is detachably mounted and a receiving position where the optical disk is received in the frame;
   a tray receiving releasing member that releases the tray from the frame; and
   an optical disk rotation suppressing member that exerts a pressing force on a circumferential portion of the optical disk in cooperation with a releasing operation of the tray receiving releasing member to stop rotation of the optical disk,
   wherein the tray receiving releasing member includes:
   an eject lever that releases the receiving position of the tray in the frame;
   a latching solenoid that maintains the receiving state by a suction force of a permanent magnet to a metal piece, and
   a compulsory ejection member that releases fixing of the tray and the frame by releasing the suction force by receiving a compulsory force to the eject lever, and
   wherein the compulsory ejection member moves the eject lever in parallel to a direction substantially equal to a direction where the eject lever is exerted by the compulsory force so as to press the optical disk rotation suppressing member to the circumferential portion of the optical disk.

9. The optical disk apparatus according to claim 8, wherein the eject lever is constructed to move in a direction substantially equal to a direction of a force that is exerted on the compulsory ejection member.

\* \* \* \* \*